(12) United States Patent
Oh et al.

(10) Patent No.: US 9,736,507 B2
(45) Date of Patent: Aug. 15, 2017

(54) BROADCAST SIGNAL TRANSMISSION METHOD AND APPARATUS FOR PROVIDING HDR BROADCAST SERVICE

(71) Applicant: LG Electronics Inc., Seoul (KR)

(72) Inventors: Hyunmook Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/024,197

(22) PCT Filed: Nov. 12, 2014

(86) PCT No.: PCT/KR2014/010875
§ 371 (c)(1),
(2) Date: Mar. 24, 2016

(87) PCT Pub. No.: WO2015/072754
PCT Pub. Date: May 21, 2015

(65) Prior Publication Data
US 2016/0301959 A1    Oct. 13, 2016

Related U.S. Application Data

(60) Provisional application No. 61/903,957, filed on Nov. 13, 2013.

(51) Int. Cl.
*H04N 21/2343* (2011.01)
*H04N 21/236* (2011.01)
(Continued)

(52) U.S. Cl.
CPC ... *H04N 21/234327* (2013.01); *H04N 21/236* (2013.01); *H04N 21/2362* (2013.01); *H04N 21/816* (2013.01)

(58) Field of Classification Search
CPC .................. H04N 21/234327; H04N 21/236
See application file for complete search history.

(56) References Cited

U.S. PATENT DOCUMENTS 6,501,797 B1 * 12/2002 van der Schaar ...... H04N 19/37
375/240.08
2011/0055550 A1 * 3/2011 Jung ................... H04L 12/6418
713/151

(Continued)

FOREIGN PATENT DOCUMENTS

EP       1827024 A1    8/2007
KR   1020090066177 A   6/2009
(Continued)

OTHER PUBLICATIONS

"Information technology—Coding of audio-visual objects—Part 15: Advanced Video Coding (AVC) file format", ISO/IEC JTC 1/SC 29, Jan. 22, 2010, ISO/IEC JTC 1/SC 29/WG 11, XP030017636.

(Continued)

*Primary Examiner* — Randy Flynn
(74) *Attorney, Agent, or Firm* — Dentons US LLP

(57) ABSTRACT

The present invention relates to a broadcast signal transmission/reception method and an apparatus therefor for providing a HDR broadcast service. The broadcast signal transmission method according to one embodiment of the present invention comprises the steps of: generating LDR video data by converting the dynamic range of HDR video data; generating residual information; generating a base layer stream by encoding the generated LDR video data; generating an enhancement layer stream by encoding the generated residual information; generating signaling information including information for decoding the enhancement layer stream; multiplexing the generated base layer stream, the enhancement layer stream and the signaling information into (Continued)

one broadcast stream; generating a broadcast signal including the multiplexed broadcast stream; and transmitting the generated broadcast signal.

10 Claims, 23 Drawing Sheets

(51) Int. Cl.
*H04N 21/2362* (2011.01)
*H04N 21/81* (2011.01)

(56) References Cited

U.S. PATENT DOCUMENTS

| | | | |
|---|---|---|---|
| 2011/0164683 A1* | 7/2011 | Takahashi | H04N 19/70 375/240.16 |
| 2011/0194618 A1* | 8/2011 | Gish | H04N 19/63 375/240.25 |
| 2012/0201456 A1 | 8/2012 | El-Mahdy et al. | |
| 2012/0314773 A1* | 12/2012 | Gish | H04N 19/61 375/240.16 |
| 2013/0083838 A1* | 4/2013 | Touze | H04N 19/70 375/240.01 |
| 2013/0107956 A1 | 5/2013 | Muijs et al. | |
| 2013/0108183 A1* | 5/2013 | Bruls | H04N 19/30 382/233 |

FOREIGN PATENT DOCUMENTS

| | | |
|---|---|---|
| KR | 10-2013-0036730 A | 4/2013 |
| WO | 2012-153224 A1 | 11/2012 |
| WO | 2013077670 A1 | 5/2013 |

OTHER PUBLICATIONS

Sony, S. Hattori et al., "Signalling of Luminance Dynamic Range in Tone mapping information SEI", Joint Collaborative Team on Video Coding (JCT-VC) of ITU-T SG 16 WP 3 and ISO/IEC JTC 1/SC 29/WG 11, Jul. 11-20, 2012, JCTVC-J0149, XP030053806.

Z. Mai et al., "Optimizing a Tone Curve for Backward-Compatible High Dynamic Range Image and Video Compression", IEEE Transactions on Image Processing, vol. 20, No. 6, Jun. 2011, XP011411814.

B. Mandel et al., "High Dynamic Range video coding results", Joint Collaborative Team on Video Coding (JCT-VC) of ITU-T SG 16 WP 3 and ISO/IEC JTC 1/SC 29/WG 11, Oct. 23-Nov. 1, 2013, JCTVC-O0101r3, XP030115093.

* cited by examiner

FIG. 7

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i = 0 ; i < N ; i++) { | | |
|         descriptor() | | |
|     } | | |
|     for (i = 0 ; i < N1 ; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i = 0 ; i < N2 ; i++) { | | |
|             descriptor() | | |
|         } | | |
|     } | | |
|     CRC_32 | 32 | rpchof |

FIG. 8

| Syntax | No. of bits | Mnemonic |
|---|---|---|
| UD_program_descriptor ( ) { | | |
|     descriptor_tag | 8 | uimsbf |
|     descriptor_length | 8 | uimsbf |
|     UD_program_format_type | 8 | uimsbf |
| } | | |

FIG. 9

| Syntax | Description |
|---|---|
| Program map section ( ) { <br> ... <br>     stream_type <br>     elementary_PID <br>     HEVC_video_descriptor ( ) <br>     stream_type <br>     elementary_PID <br>     HDR_sub_stream_descriptor ( ) <br> ... <br> } | <br><br>0x24 (HEVC video codec) <br> 0x109A <br> HEVC video descriptor <br> 0xA1 (HEVC scalable layer video codec) <br> 0x109B <br> Information about enhancement layer, information necessary for HDR video configuration |

FIG. 10

| Syntax | No. of bits | Format |
|---|---|---|
| HDR_sub_stream_descriptor ( ) { | | |
|     descriptor_tag | 8 | uimsbf |
|     descriptor_length | 5 | uimsbf |
|     reserved | 3 | |
|     EL_video_codec_type | 8 | uimsbf |
|     EL_video_profile | 8 | uimsbf |
|     EL_video_level | 8 | uimsbf |
|     EL_video_tier | 8 | uimsbf |
| } | | |

FIG. 11

| sei_payload ( payloadType , payloadSize ) { | Category | Descriptor |
|---|---|---|
| ... | | |
|   if( payloadType == 52 ) | | |
|     UDTV_scalable_dynamic_range_service_info ( payloadSize ) | 5 | |

FIG. 12

| UDTV_scalable_dynamic_range_service_info (payloadSize) { | C | Descriptor |
|---|---|---|
|   UD_program_format_type | 5 | u(8) |
|   if(UD_program_format_type == '0x09') { | | |
|     HDR_substream_metadata () | | |
|   } | | |
| } | | |

FIG. 13

| | No. of bits | Format |
|---|---|---|
| HDR_substream_metadata ( ) { | | |
|     original_UD_video_type | 4 | uimsbf |
|     reserved | 4 | uimsbf |
|     LDR_dynamic_range_type | 4 | uimsbf |
|     HDR_dynamic_range_type | 4 | uimsbf |
|     if(LDR_dynamic_range_type == '1000'){ | | |
|         LDR_luminance_max | 8 | uimsbf |
|         LDR_luminance_min | 8 | uimsbf |
|     } | | |
|     if(HDR_dynamic_range_type == '1000'){ | | |
|         HDR_luminance_max | 8 | uimsbf |
|         HDR_luminance_min | 8 | uimsbf |
|     } | | |
|     LDR_EOTF_type | 4 | uimsbf |
|     HDR_EOTF_type | 4 | uimsbf |
|     if(LDR_EOTF_type == '1111'){ | | |
|         number_of_coeff | 8 | uimsbf |
|         for(i=0; i<number_of_coeff; i++) | | |
|             LDR_EOTF_coeff[i] | 8 | uimsbf |
|     } | | |
|     if(HDR_EOTF_type == '1111'){ | | |
|         number_of_coeff | 8 | uimsbf |
|         for(i=0; i<number_of_coeff; i++) | | |
|             HDR_EOTF_coeff[i] | 8 | uimsbf |
|     } | | |
|     DR_transformation_curve_type | 8 | uimsbf |
|     DR_transformation_curve () | | |
| } | | |

FIG. 14

| | No. of bits | Format |
|---|---|---|
| DR_transformation_curve () { | | |
|   if (DR_transformation_curve_type=='0x00'){ | | |
|     gain | 8 | uimsbf |
|     offset | 8 | uimsbf |
|   } | | |
|   else if (DR_transformation_curve_type=='0x01'){ | | |
|     gain | 8 | uimsbf |
|     offset | 8 | uimsbf |
|     coeff_a | 8 | uimsbf |
|   } | | |
|   else if (DR_transformation_curve_type=='0x02'){ | | |
|     gain | 8 | uimsbf |
|     offset | 8 | uimsbf |
|     coeff_a | 8 | uimsbf |
|   } | | |
|   else if (DR_transformation_curve_type=='0x03'){ | | |
|     intersection_x | 8 | uimsbf |
|     gain1 | 8 | uimsbf |
|     offset1 | 8 | uimsbf |
|     coeff_a1 | 8 | uimsbf |
|     gain2 | 8 | uimsbf |
|     offset2 | 8 | uimsbf |
|     coeff_a2 | 8 | |
|   } | | |
| ... (Continued on next page) | | |

FIG. 15

| Syntax | No. of bits | Format |
|---|---|---|
| ... (Continued from previous page) | | |
|    else if (DR_transformation_curve_type=='0x04') { | | |
|      number_section | 8 | uimsbf |
|      for(i=0; number_section; i++){ | | |
|         intersection_x[i] | 8 | uimsbf |
|         intersection_y[i] | 8 | |
|         DR_transformation_curve_type[i] | 8 | uimsbf |
|         if (DR_transformation_curve_type=='0x00') { | | |
|            gain[i] | 8 | uimsbf |
|            offset[i] | 8 | uimsbf |
|         } | | |
|         else if (DR_transformation_curve_type=='0x01') { | | |
|            gain[i] | 8 | uimsbf |
|            offset[i] | 8 | uimsbf |
|            coeff_a[i] | 8 | uimsbf |
|         } | | |
|         else if (DR_transformation_curve_type=='0x02') { | | |
|            gain[i] | 8 | uimsbf |
|            offset[i] | 8 | uimsbf |
|            coeff_a[i] | 8 | uimsbf |
|         } | | |
|    else if (DR_transformation_curve_type=='0x05') { | | |
|      entry_length | 8 | uimsbf |
|      for (i=0; i<entry_length; i++) { | | |
|         in_value | 8 | uimsbf |
|         out_value | 8 | uimsbf |
|      } | | |
|    } | | |
| } | | |

FIG. 16

| UD_video_type | Description |
|---|---|
| 0000 ~ 0010 | reserved |
| 0011 | 3840 x 2160, 60p |
| 0100 | 3840 x 2160, 120p |
| 0101 | 4096 x 2160, 60p |
| 0110 | 4096 x 2160, 120p |
| 0111 | 7680 x 4320, 60p |
| 1000 | 7680 x 4320, 120p |
| 1001 | 8192 x 4320, 60p |
| 1010 | 8192 x 4320, 120p |
| 1011 -1111 | reserved |

FIG. 17

| LDR_Dynamic_range_type, HDR_Dynamic_range_type | Description |
|---|---|
| 0000 | reserved |
| 0001 | SMPTE XXXX-201X-1 Reference Display for HDTV Images |
| 0100-0111 | reserved |
| 1000 | User define |
| 1011-1111 | Private use |

FIG. 18

| LDR_EOTF_type | Description |
|---|---|
| 0000 | reserved |
| 0001 | private |
| 0010 | ITU-R BT.1886 |
| 0011 | ITU-R REC.709 |
| 0100 | ITU-R BT.2020 |
| 0101~1111 | reserved |

FIG. 19

| HDR_EOTF_type | Description |
|---|---|
| 0000 | Not use HDR EOTF |
| 0001 | private |
| 0010 | ITU-R BT.1886 |
| 0011 | ITU-R REC.709 |
| 0100 | ITU-R BT.2020 |
| 0101~1111 | reserved |

FIG. 20

| DR_transformation_curve_type | Description |
|---|---|
| 0x00 | Linear function |
| 0x01 | Logarithmic function |
| 0x02 | Exponential function |
| 0x03 | Inverse s-curve |
| 0x04 | Piecewise non-linear curves |
| 0x05 | Look-up table |
| 0x06 ~ 0xFF | Reserved |

FIG. 21 out = gain × in + offset  — 21010 out = gain × $e^{(coeff\_a \times in)}$ + offset  — 21020 out = gain × log(coeff_a × in) + offset  — 21030

$$out = \begin{cases} gain1 \times \log(coeff\_a1 \times in)e^{(coeff\_a1 \times in)} + offset1 & if(in < intersection\_x) \\ gain2 \times e^{(coeff\_a2 \times in)} - offset2 & else \end{cases}$$  — 21040

$$out = \begin{cases} gain1 \times \log(coeff\_a1 \times in) + offset1 & if(in < intersection\_X[0]) \\ gain2 \times in + offset2 & else\ if(in \geq intersection\_X[0]\ \&\ in < intersection\_X[1]) \\ gain3 \times e^{(coeff\_a3 \times in)} - offset3 & else \end{cases}$$  — 21050

FIG. 22

| Syntax | No. of bits | Format |
|---|---|---|
| HDR_sub_stream_descriptor ( ) { | | |
|     descriptor_tag | 8 | uimsbf |
|     descriptor_length | 5 | uimsbf |
|     reserved | 3 | |
|     EL_video_codec_type | 8 | uimsbf |
|     EL_video_profile | 8 | uimsbf |
|     EL_video_level | 8 | uimsbf |
|     HDR_substream_metadata ( ) | | |
| } | | |

FIG. 23

| Syntax | number of bits | Identifier |
|---|---|---|
| service_description_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
| | 16 | uimsbf |
|     transport_stream_id | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i = 0 ; i < N ; i ++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (j = 0 ; j < N ; j ++) { | | |
|             descriptor() | | |
|         } | | |
|     } | | |
|     CRC_32 | 32 | rpchof |

FIG. 24

| Syntax | number of bits | Identifier |
|---|---|---|
| event_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i = 0 ; i < N ; i ++) { | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptors_loop_length | 12 | uimsbf |
|         for (i = 0 ; i < N ; i ++) { | | |
|             descriptor() | | |
|         } | | |
|     } | | |
|     CRC_32 | 32 | rpchof |

FIG. 25

| Syntax | No. of bits | Format |
|---|---|---|
| terrestrial_virtual_channel_table_section() { | | |
|     table_id | 8 | 0×C8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for (i = 0 ; i < num_channels_in_section ; i ++) { | | |
|         short_name | 7*16 | uimsbf |
|         reserved | 4 | '1111' |
|         major_channel_number | 10 | bslbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for (i = 0; i < N; i ++) { | | |
|             descriptor() | | |
|         } | | |
|     } | | |

BROADCAST SIGNAL TRANSMISSION METHOD AND APPARATUS FOR PROVIDING HDR BROADCAST SERVICE

This application is a 35 USC §371 National Stage entry of International Application No. PCT/KR2014/010875 filed on Nov. 12, 2014, which claims priority to U.S. Provisional Application No. 61/903,957, filed on Nov. 13, 2013, all of which are incorporated by reference in their entirety herein.

TECHNICAL FIELD

The present invention relates to transmission and reception of a broadcast signal. More particularly, the present invention relates to a method and/or apparatus for transmitting and receiving a broadcast signal for providing a High Dynamic Range (HDR) broadcast service.

BACKGROUND ART

An Ultra High Definition (UHD) broadcast may provide a service differentiated from an existing broadcast and provide a high sense of presence of a high level, by representing luminance that has not been expressed in conventional content. However, research into High Dynamic Range (HDR) video is underway and development of a method for acquiring an HDR image and a display device capable of displaying the HDR image is still in progress. Therefore, a method is needed in which a legacy receiver having difficulty in expressing an HDR is capable of representing content with the HDR image even in an environment in which the HDR image is provided. Currently, as a method for considering backward compatibility in an environment having a limited transmission bandwidth, a scalable approach scheme is being used and a study is needed to enable configuration and display of a dynamic rage image suitable for the capability of each receiver, using the scalable approach scheme.

In the UHD broadcast, there has been discussion focusing on providing realistic content to viewers in various aspects in order to provide a broadcast service differentiated from an existing High Definition (HD) broadcast. Thereamong, the necessity for an HDR has been stressed to cause a luminance expression range of content to approximate to a human visual system. However, when content with the HDR is obtained and transmitted, the case may occur in which a legacy display does not properly present the content or cannot display the content at all. In a situation in which a study about the HDR and discussion about specification related to the HDR are being conducted, an HDR display will be supplied and a technique for providing an HDR broadcast service considering backward compatibility with a legacy display is needed.

Meanwhile, in a situation in which content and display having an HDR are introduced to a broadcast, it is necessary to supply proper content according to the luminance expression range of a consumer display. That is, content suitable for a dynamic range characteristic of each of a display having an existing Low Dynamic Range (LDR) and a display having an HDR needs to be supplied. However, provision of the same content with different dynamic ranges in a situation in which bandwidth for a broadcast service is limited has a problem of using double an existing bandwidth.

DETAILED DESCRIPTION OF THE INVENTION

Technical Problems

An object of the present invention devised to solve the problem lies in providing a method and/or an apparatus for transmitting and receiving a broadcast signal for providing an HDR broadcast service.

Another object of the present invention is to provide a method and/or an apparatus for transmitting and receiving a broadcast signal having backward compatibility so as to view content even in a legacy receiver.

Another object of the present invention is to simultaneously provide a broadcast signal having different dynamic ranges using a scalable approach.

Another object of the present invention is to provide a method for signaling information about a dynamic range of transmitted content.

Technical Solutions

According to an aspect of the present invention, provided herein is a method for transmitting a broadcast signal, including generating Low Dynamic Range (LDR) video data by transforming a dynamic range of High Dynamic Range (HDR) video data, generating residual information indicating a difference value calculated by comparing, in units of pixels, luminance of HDR estimation video data, which is generated by inversely transforming a dynamic range of the generated LDR video data, with luminance of the HDR video data, generating a base layer stream by encoding the generated LDR video data, generating an enhancement layer stream by encoding the generated residual information, generating signaling information including information for decoding the enhancement layer stream, multiplexing the base layer stream, the enhancement layer stream, and the signaling information into one broadcast stream, generating a broadcast signal including the multiplexed broadcast stream, and transmitting the generated broadcast signal.

The signaling information may include HDR configuration information needed to generate the HDR estimation video data from the generated LDR video data.

The information for decoding the enhancement layer stream may include tier information for determining a limit of a bit rate of the enhancement layer stream and include at least one of type information of a codec used for the enhancement layer stream, profile information indicating a characteristic of the enhancement layer stream, and level information indicating an application range of the characteristic of the enhancement layer stream according to the profile information.

The HDR configuration information may include at least one of LDR dynamic range type information indicating the dynamic range of the LDR video data, HDR dynamic range type information indicating the dynamic range of the HDR video data, and information about a transformation curve used to transform the dynamic range of the LDR video data into the HDR estimation video data.

The HDR configuration information may include at least one of information indicating a type of an Electro Optical Transfer Function (EOTF) that has been used to color-encode the LDR video data, information indicating a type of an EOTF that has been used to color-encode the HDR video data, information indicating a maximum value of a dynamic range expressed in the LDR video data, information indicating a minimum value of the dynamic range expressed in the LDR video data, information indicating a maximum value of a dynamic range expressed in the HDR video data, and information indicating a minimum value of the dynamic range expressed in the HDR video data.

The signaling information may include a Program Map Table (PMT) and a Supplemental Enhancement Information (SEI) message, the PMT may include the information for decoding the enhancement layer stream, and the SEI message may include the HDR configuration information.

The signaling information may include at least one of a Program Map Table (PMT), a Service Description Table (SDT), an Event Information Table (EIT), a Terrestrial Virtual Channel Table (TVCT), and a Cable Virtual Channel Table (CVCT) and the at least one of the PMT, the SDT, the EIT, the TVCT, and the CVCT may include the information for decoding the enhancement layer stream and the HDR configuration information.

According to another aspect of the present invention, provided herein is a method for receiving a broadcast signal, including receiving a broadcast signal including Low Dynamic Range (LDR) video data, residual information, and signaling information, wherein the LDR video data is generated by transforming a dynamic range of High Dynamic Range (HDR) video data, the residual information indicates a difference value calculated by comparing, in units of pixels, luminance of HDR estimation video data, which is generated by inversely transforming a dynamic range of the LDR video data, with luminance of the HDR video data, and the signaling information includes information for decoding an enhancement layer stream including the residual information, acquiring a broadcast stream by demodulating the received broadcast signal, extracting a base layer stream including the LDR video data, an enhancement layer stream including the residual information, and/or the signaling information from the acquired broadcast stream, acquiring the LDR video data by decoding the extracted base layer stream, acquiring the residual information by decoding the extracted enhancement layer stream based on the extracted signaling information, acquiring the HDR estimation video data by inversely transforming the dynamic range of the acquired LDR video data, and acquiring the HDR video data based on the acquired residual information and the acquired HDR estimation video data.

The signaling information may include HDR configuration information needed to generate the HDR estimation video data from the generated LDR video data.

The information for decoding the enhancement layer stream may include tier information for determining a limit of a bit rate of the enhancement layer stream and include at least one of type information of a codec used for the enhancement layer stream, profile information indicating a characteristic of the enhancement layer stream, and level information indicating an application range of the characteristic of the enhancement layer stream according to the profile information.

The HDR configuration information may include at least one of LDR dynamic range type information indicating the dynamic range of the LDR video data, HDR dynamic range type information indicating the dynamic range of the HDR video data, and information about a transformation curve used to transform the dynamic range of the LDR video data into the HDR estimation video data.

The HDR configuration information may include at least one of information indicating a type of an Electro Optical Transfer Function (EOTF) that has been used to color-encode the LDR video data, information indicating a type of an EOTF that has been used to color-encode the HDR video data, information indicating a maximum value of a dynamic range expressed in the LDR video data, information indicating a minimum value of the dynamic range expressed in the LDR video data, information indicating a maximum value of a dynamic range expressed in the HDR video data, and information indicating a minimum value of the dynamic range expressed in the HDR video data.

The signaling information may include a Program Map Table (PMT) and a Supplemental Enhancement Information (SEI) message, the PMT may include the information for decoding the enhancement layer stream, and the SEI message may include the HDR configuration information.

The signaling information may include at least one of a Program Map Table (PMT), a Service Description Table (SDT), an Event Information Table (EIT), a Terrestrial Virtual Channel Table (TVCT), and a Cable Virtual Channel Table (CVCT) and the at least one of the PMT, the SDT, the EIT, the TVCT, and the CVCT may include the information for decoding the enhancement layer stream and the HDR configuration information.

According to another aspect of the present invention, provided herein is an apparatus for transmitting a broadcast signal, including a dynamic range transformation unit configured to generate Low Dynamic Range (LDR) video data by transforming a dynamic range of High Dynamic Range (HDR) video data, an inverse dynamic range transformation unit configured to generate residual information indicating a difference value calculated by comparing, in units of pixels, luminance of HDR estimation video data, which is generated by inversely transforming a dynamic range of the generated LDR video data, with luminance of the HDR video data, a first encoder configured to generate a base layer stream by encoding the generated LDR video data, a second encoder configured to generate an enhancement layer stream by encoding the generated residual information, a signaling information generation unit configured to generate signaling information including information for decoding the enhancement layer stream, wherein the generated signaling information includes HDR configuration information needed to generate the HDR estimation video data from the generated LDR video data, a multiplexer configured to multiplex the base layer stream, the enhancement layer stream, and the signaling information into one broadcast stream, a modulator configured to generate a broadcast signal including the multiplexed broadcast stream, and a transmitter configured to transmit the generated broadcast signal.

According to another aspect of the present invention, provided herein is an apparatus for receiving a broadcast signal, including a receiver configured to receive a broadcast signal including Low Dynamic Range (LDR) video data, residual information, and signaling information, wherein the LDR video data is generated by transforming a dynamic range of High Dynamic Range (HDR) video data, the residual information indicates a difference value calculated by comparing, in units of pixels, luminance of HDR estimation video data, which is generated by inversely transforming a dynamic range of the LDR video data, with luminance of the HDR video data, and the signaling information includes information for decoding an enhancement layer stream including the residual information, a demodulator configured to acquire a broadcast stream by demodulating the received broadcast signal, a demultiplexer configured to extract a base layer stream including the LDR video data, an enhancement layer stream including the residual information, and/or the signaling information from the acquired broadcast stream, a first decoder configured to acquire the LDR video data by decoding the extracted base layer stream, and a second decoder configured to acquire the residual information by decoding the extracted enhancement layer stream based on the extracted signaling information, acquire the HDR estimation video data by inversely transforming the dynamic range of the acquired LDR video data, and acquiring the HDR video data based on the acquired residual information and the acquired HDR estimation video data.

Advantageous Effects

According to the present invention, an HDR broadcast service can be provided.

According to the present invention, a broadcast service having a dynamic range that a legacy receiver can display can be provided even in an environment in which an HDR broadcast service is provided According to the present invention, transmission bandwidth can be efficiently used by using a scalable approach.

DESCRIPTION OF DRAWINGS

FIG. 7 is a diagram illustrating the configuration of a Program Map Table (PMT) according to an embodiment of the present invention.

FIG. 8 is a diagram illustrating the configuration of UD_program_descriptor( ) according to an embodiment of the present invention.

FIG. 9 is a diagram illustrating the configuration of a PMT in a stream unit according to an embodiment of the present invention.

FIG. 10 is a diagram illustrating the configuration of HDR_sub_stream_descriptor( ) according to an embodiment of the present invention.

FIG. 11 is a diagram illustrating the configuration of a payload of a Supplemental Enhancement Information (SEI) message according to an embodiment of the present invention.

FIG. 12 is a diagram illustrating the configuration of UDTV_scalable_dynamic_range_service_info( ) according to an embodiment of the present invention.

FIG. 13 is a diagram illustrating the configuration of HDR_substream_metadata( ) according to an embodiment of the present invention.

FIG. 14 is a diagram illustrating the configuration of DR_transformation_curve( ) according to an embodiment of the present invention.

FIG. 15 is a diagram illustrating the configuration of DR_transformation_curve( ) according to an embodiment of the present invention.

FIG. 16 is a diagram illustrating original_UD_video_type according to an embodiment of the present invention.

FIG. 17 is a diagram illustrating a dynamic range type used in LDR_dynamic_range_type and/or HDR_dynamic_range_type according to an embodiment of the present invention.

FIG. 18 is a diagram illustrating LDR_EOTF_type according to an embodiment of the present invention.

FIG. 19 is a diagram illustrating HDR_EOTF_type according to an embodiment of the present invention.

FIG. 20 is a diagram illustrating DR_transformation_curve_type according to an embodiment of the present invention.

FIG. 21 is a diagram illustrating an equation of a dynamic range transformation function (DR_transformation_curve) according to an embodiment of the present invention.

FIG. 22 is a diagram illustrating the configuration of HDR_sub_stream_descriptor( ) according to an embodiment of the present invention.

FIG. 23 is a diagram illustrating the configuration of a Service Description Table (SDT) according to an embodiment of the present invention.

FIG. 24 is a diagram illustrating the configuration of an Event Information Table (EIT) according to an embodiment of the present invention.

FIG. 25 is a diagram illustrating the configuration of a Terrestrial Virtual Channel Table (TVCT) according to an embodiment of the present invention.

BEST MODE FOR CARRYING OUT THE INVENTION

Reference will now be made in detail to the exemplary embodiments of the present invention, examples of which are illustrated in the accompanying drawings and the invention should not be limited to the specific embodiments described herein Although the terms used in the present invention are selected from generally known and used terms while considering functions of the present invention, the terms may be changed according to intention or customs of those skilled in the art or to emergence of new technology. Some of the terms mentioned in the description of the present invention have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

Figure 1:
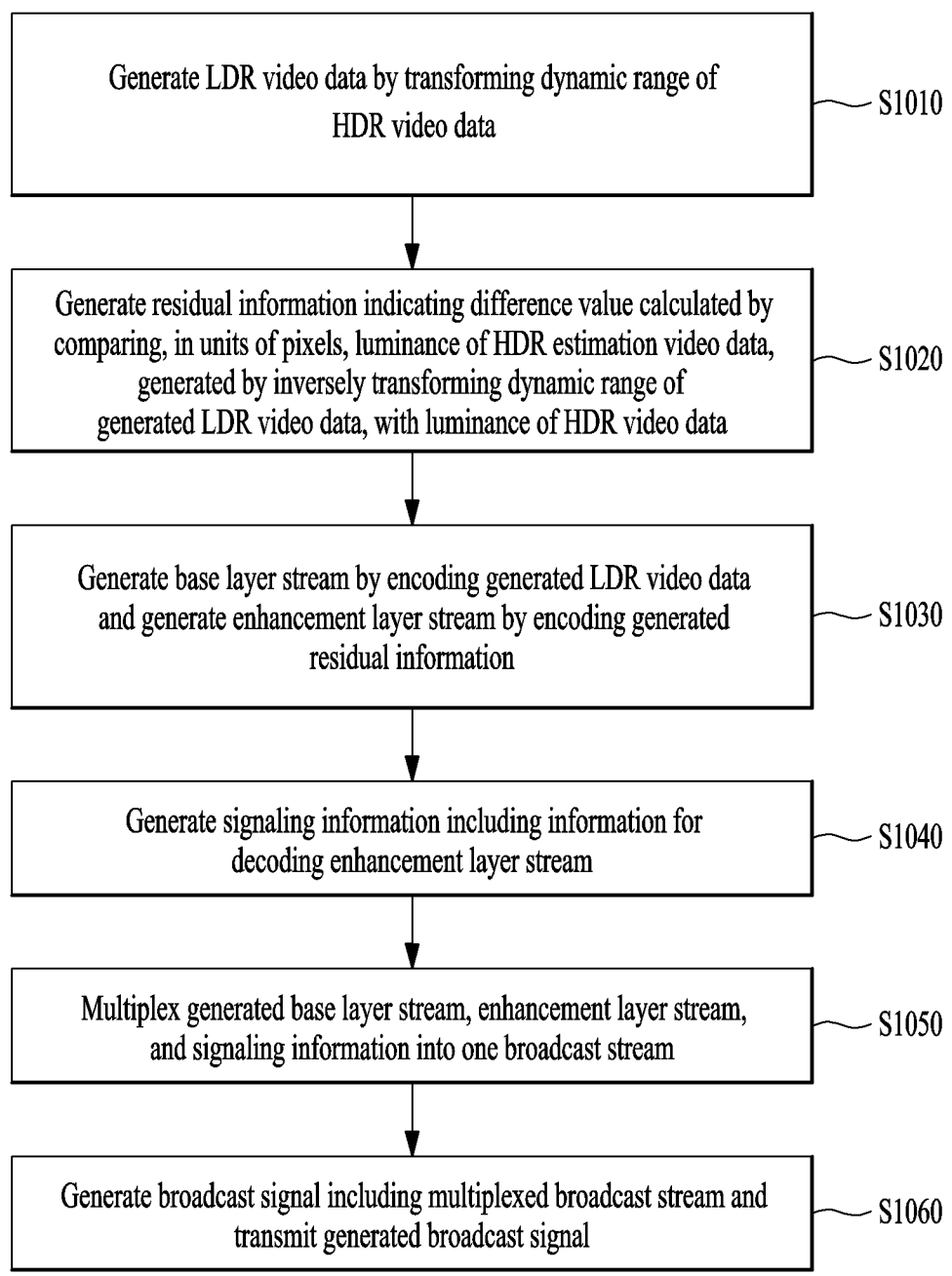
FIG. 1 is a flowchart illustrating a broadcast signal transmission method according to an embodiment of the present invention.

FIG. 1 is a flowchart illustrating a broadcast signal transmission method according to an embodiment of the present invention.

The broadcast signal transmission method according to an embodiment of the present invention may include the following processes. LDR video data may be generated by transforming a dynamic range of HDR video data (S1010), which will be described later with reference to FIGS. 13, 22, 26, 27, and 29. Next, residual information indicating a difference value calculated by comparing, in units of pixels, the luminance of HDR estimation video data, which is generated by inversely transforming a dynamic range of the generated LDR video data, with the luminance of the HDR video data may be generated (S1020), which will be described later with reference to FIGS. 2, 3, 8, 12, 26, 27, 28, and 29. Next, a base layer stream may be generated by encoding the generated LDR video data and an enhancement layer stream may be generated by encoding the generated residual information (S1030), which will be described later with reference to FIGS. 2, 26, 27, 28, 29, and 30. Next, signaling information including information for decoding the enhancement layer stream may be generated (S1040). Next, the base layer stream, the enhancement layer stream, and the signaling information may be multiplexed into one broadcast stream (S1050). Next, a broadcast signal including the multiplexed broadcast stream may be generated and the generated broadcast signal may be transmitted (S1060). In this case, when the above-described residual information is not needed, i.e., when the HDR estimation video data and the original HDR video data have no difference or the difference therebetween is negligible, the residual information may not be transmitted.

According to another embodiment of the present invention, the signaling information may include HDR configuration information necessary to generate the HDR estimation video data from the LDR video data. Details of the HDR configuration information will be described later with reference to FIGS. 3, 7, 12, 13, 22, and 27.

According to another embodiment of the present invention, the information for decoding the enhancement layer stream may include tier information for determining the limit of a bit rate of the enhancement layer stream, type information of a codec used for the enhancement layer stream, profile information indicating the characteristic of the enhancement layer stream, and/or level information indicating an application range of the characteristic of the enhancement layer stream according to the profile information. Details of the information for decoding the enhancement layer stream will be described later with reference to FIGS. 2, 7, 10, 22, 26, and 27.

According to another embodiment of the present invention, the HDR configuration information may include LDR dynamic range type information indicating the dynamic range of the LDR video data, HDR dynamic range type information indicating the dynamic range of the HDR video data, and/or information about a transformation curve used to transform the dynamic range of the LDR video data into the HDR estimation video data. Details of the HDR configuration information will be described in conjunction with FIGS. 3, 7, 12, 13, 22, and 27.

According to another embodiment of the present invention, the HDR configuration information may include information indicating a type of an Electro Optical Transfer Function (EOTF) that has been used to color-encode the LDR video data, information indicating a type of an EOTF that has been used to color-encode the HDR video data, information indicating a maximum value of a dynamic range expressed in the LDR video data, information indicating a minimum value of the dynamic range expressed in the LDR video data, information indicating a maximum value of a dynamic range expressed in the HDR video data, and/or information indicating a minimum value of the dynamic range expressed in the HDR video data. Details of the HDR configuration information will be described later in conjunction with FIGS. 3, 7, 12, 13, 22, and 27.

According to another embodiment of the present invention, the signaling information may include a Program Map Table (PMT) and/or a Supplemental Enhancement Information (SEI) message. The PMT may include the information for decoding the enhancement layer stream and the SEI message may include the HDR configuration information. Details of the signaling information will be described with reference to FIGS. 7, 9, 10, 11, 22, 25, 26, and 27.

According to another embodiment of the present invention, the signaling information may include the PMT, a Service Description Table (SDT), an Event Information Table (EIT), a Terrestrial Virtual Channel Table (TVCT), and/or a Cable Virtual Channel Table (CVCT). At least one of the PMT, the SDT, the EIT, the TVCT, and the CVCT may include the information for decoding the enhancement layer stream and/or the HDR configuration information, which will be described in detail with reference to FIGS. 10 and 22.

Figure 2:
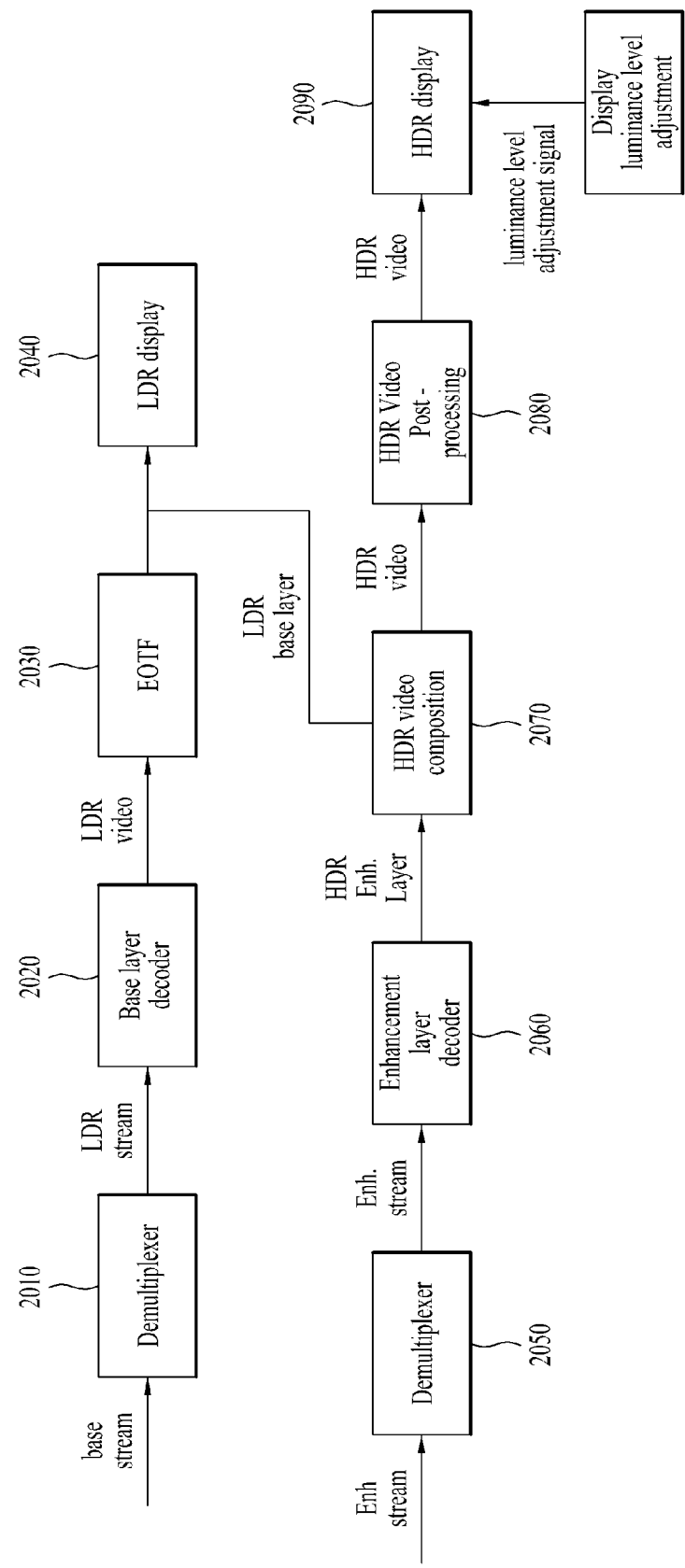
FIG. 2 is a diagram illustrating the structure of a broadcast signal reception apparatus for HDR video data having backward compatibility according to an embodiment of the present invention.

FIG. 2 is a diagram illustrating the structure of a broadcast signal reception apparatus for HDR video data having backward compatibility according to an embodiment of the present invention.

The reception apparatus according to an embodiment of the present invention may include a first demultiplexer 2010, a base layer decoder 2020, an EOTF processing unit 2030, an LDR display 2040, a second demultiplexer 2050, an enhancement layer decoder 2060, an HDR video composition unit 2070, an HDR video post-processing unit 2080, and/or an HDR display 2090.

The first demultiplexer 2010 may extract a base layer stream including LDR video data from a multiplexed broadcast stream.

The base layer decoder 2020 may acquire the LDR video data by decoding the base layer stream. An LDR stream denoted in the drawing may mean the base layer stream. The base layer decoder may use a codec such as High Efficiency Video Coding (HEVC).

The EOTF processing unit 2030 may process an EOTF that has been used for color encoding of a base layer, using an EOTF transmitted through signaling information (metadata).

The LDR display 2040 may reproduce EOTF-processed LDR video data through a legacy display.

The second demultiplexer 2050 may extract an enhancement layer stream including residual information from the multiplexed broadcast stream. The residual information may indicate a difference value calculated by comparing, in units of pixels, the luminance of HDR estimation video data, which is generated by inversely transforming a dynamic range of the generated LDR video data, with the luminance of the HDR video data The enhancement layer decoder 2060 may acquire the residual information by decoding the enhancement layer stream. The enhancement layer decoder may decode the enhancement layer stream based on the signaling information including information for decoding the enhancement layer stream.

The HDR video composition unit 2070 may restore HDR video data, using the LDR video data and the residual information. A detailed description of the HDR video composition unit 2070 will be given later.

The HDR video post-processing 2080 may adjust the luminance of content in order to provide an optimal viewing environment and a detailed description thereof will be given later.

The HDR display 2090 may reproduce the HDR video data. According to an embodiment of the present invention, when a receiver needs to change the luminance of a receiver display with respect to the HDR video data, the receiver may adjust the luminance level of the display through signaling information about luminance level adjustment.

According to an embodiment of the present invention, when a base layer and an enhancement layer are transmitted over a transport channel, while a legacy receiver processes only the base layer to reproduce an LDR image on a display, a receiver capable of processing an HDR image may restore the HDR image using the enhancement layer to reproduce the HDR image. The above description indicates backward compatibility according to an embodiment of the present invention.

According to an embodiment of the present invention, upon determining, with respect to a UHD service, that a receiver is incapable of processing the enhancement layer or that displaying an HDR image obtained through the enhancement layer is not proper, the receiver may decode only the base layer. The UHD service may indicate that a service having service_type in a TVCT or a CVCT described later is 0x07, 0x09, or 0x10. In addition, that the receiver is incapable of processing the enhancement layer may mean that the receiver is incapable of processing UD_program_descriptor described later, incapable of processing a program having UD_program_format_type of 0x09 described later, or incapable of processing enhancement layer stream_type described later. Further, the case in which it is determined that displaying the HDR image is not proper may indicate the case in which HDR_luminance_max described later cannot be represented and determination thereof may be made using the value of HDR_dynamic_range_type or HDR_luminance_max described later.

According to an embodiment of the present invention, if the receiver is capable of processing the enhancement layer and is capable of representing the HDR image, the receiver may obtain the HDR video data. That the receiver is capable of processing the enhancement layer may mean the case in which the receiver is capable of processing a program having UD_program_format_type of 0x09 described later and is capable of processing enhancement layer stream_type described later. The case in which the HDR image can be represented may be determined using the value of HDR_dynamic_range_type or HDR_luminance_max described later.

Figure 3:
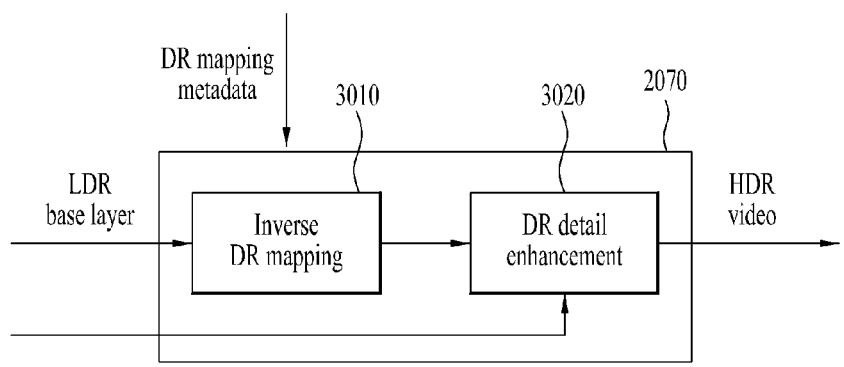
FIG. 3 is a diagram illustrating the operation of an HDR video composition unit 2070 according to an embodiment of the present invention.

FIG. 3 is a diagram illustrating the operation of an HDR video composition unit 2070 according to an embodiment of the present invention.

The operation of the HDR video composition unit 2070 according to an embodiment of the present invention may include an inverse dynamic range mapping process 3010 and/or a dynamic range detail enhancement process 3020.

The inverse dynamic range mapping process 3010 is a process of applying, to LDR video data, the inverse of a transformation function that has been applied to original HDR video data in a transmitter so that a receiver obtains HDR estimation video data. HDR configuration information may be used to obtain the HDR estimation video data. The HDR configuration information is referred to as dynamic range mapping metadata and a detailed description thereof will be given later.

The dynamic range detail enhancement process 3020 is a process of comparing, in units of pixels, the HDR estimation video data obtained through the foregoing inverse dynamic range mapping process with original HDR video data and performing mapping. When the inverse of a non-linear function is applied, bit depth compression or expansion is partially generated. During occurrence of bit depth expansion, one-to-multiple mapping occurs and, thus, original pixel values cannot be accurately expressed only by a mapping function, i.e., a transformation function. Accordingly, in the dynamic range detail enhancement process, the luminance value of the HDR estimation video data can be corrected to the luminance value of the original HDR video data through residual information included in an enhancement layer stream. A residual image, i.e., the residual information, according to an embodiment of the present invention may be configured by a difference between an inversely dynamic range mapped base layer image and an original image. That is, the residual information may indicate a difference value calculated by comparing, in units of pixels, the luminance of the HDR estimation video data, which is generated by inversely transforming a dynamic range of the LDR video data, with the luminance of the original HDR video data. When the above-described residual information is not needed, i.e., when the HDR estimation video data and the original HDR video data have no difference or the difference therebetween is negligible, the residual information may not be transmitted.

Figure 4:
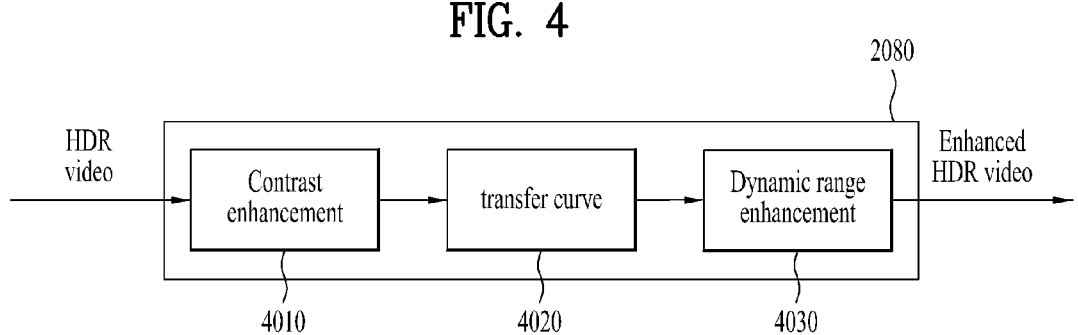
FIG. 4 is a diagram illustrating the operation of an HDR post-processing unit 2080 according to an embodiment of the present invention.

FIG. 4 is a diagram illustrating the operation of an HDR post-processing unit 2080 according to an embodiment of the present invention.

The operation of the HDR post-processing unit 2080 according to an embodiment of the present invention may include a contrast enhancement process 4010, a transfer curve processing process 4020, and/or a dynamic range enhancement process 4030.

The contrast enhancement process 4010 may enhance the contrast of HDR video data upon judging that adjusting the luminance of content in a receiver, based on maximum and/or minimum luminance information of HDR video data described later, is helpful in providing an optimal viewing environment to a viewer.

The transfer curve processing process 4020 may enhance the luminance of HDR video data by applying a transfer curve to the HDR video data when it is judged that adjusting the luminance of content in a receiver, based on the maximum and/or minimum luminance information of the HDR video data described later, is helpful in providing an optimal viewing environment to a viewer.

The dynamic range enhancement process 4030 may enhance a dynamic range of HDR video data when it is judged that adjusting the luminance of content in a receiver, based on the maximum and/or minimum luminance information of the HDR video data described later, is helpful in providing an optimal viewing environment to a viewer.

According to an embodiment of the present invention, it may be assumed that enhancement layer based HDR video data has linearity. An EOTF may be transmitted through metadata in order to properly represent an HDR and the HDR video post-processing unit 2080 of the receiver may process the EOTF.

Figure 5:
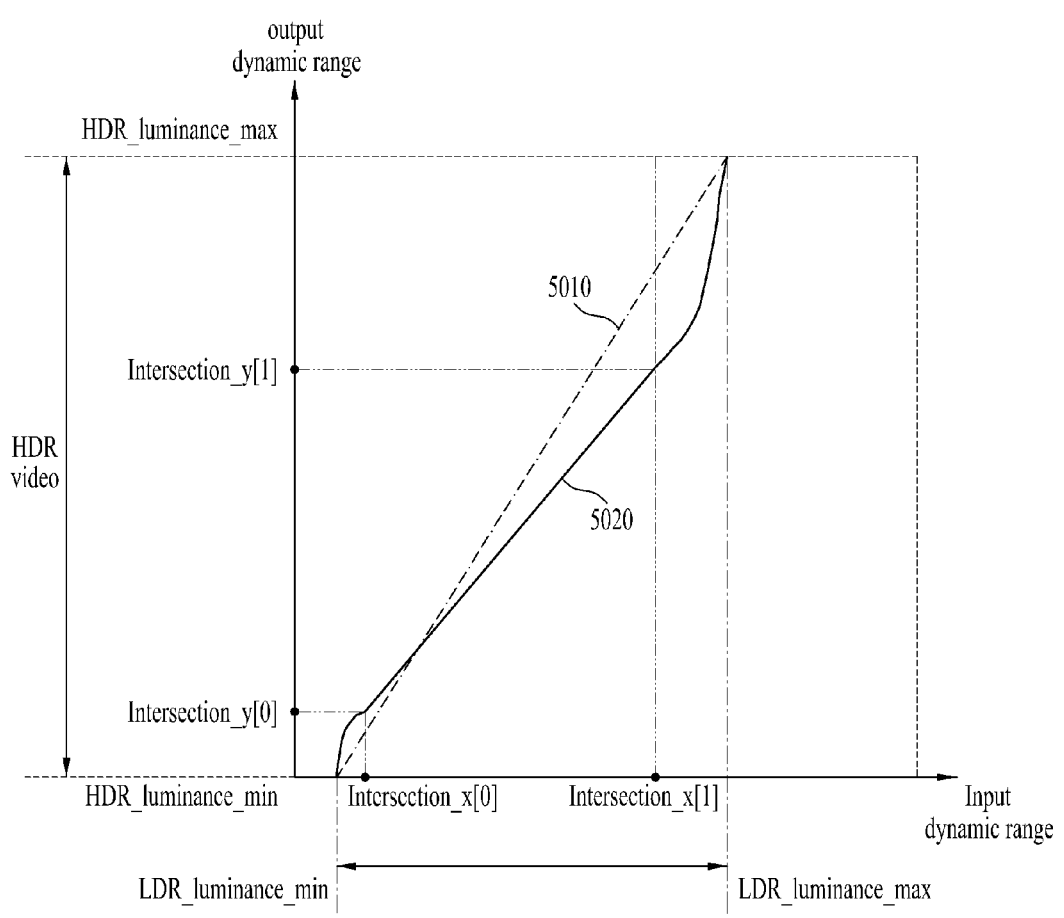
FIG. 5 is a diagram illustrating an inverse dynamic range transformation curve according to an embodiment of the present invention.

FIG. 5 is a diagram illustrating an inverse dynamic range transformation curve according to an embodiment of the present invention.

According to an embodiment of the present invention, a receiver may acquire HDR estimation video data by applying, to LDR video data, an inverse function of a dynamic range transformation curve that has been applied to original HDR video data in a transmitter. In this case, the receiver may be aware of luminance of the LDR video data and/or luminance scale information of the HDR video data through LDR_luminance_max, LDR_luminance_min, HDR_luminance_max, and/or HDR_luminance_min.

Inverse dynamic range transformation according to an embodiment of the present invention may be referred to as inverse dynamic range mapping and inverse dynamic range transformation may be performed through various methods. The above various methods may be signaled through DR_transformation_curve_type described later. A linear function may be used when linear transformation is performed from a dark part to a bright part; a logarithmic function may be used when a dark part is amplified; an exponential function may be used when a bright part is amplified; and a piecewise non-linear curve may be used according to a dynamic range section. Detailed information about the aforementioned transformation functions may be transmitted through DR_transformation_curve( ).

The inverse dynamic range transformation process according to an embodiment of the present invention may be added as one part of scalable coding and may operate in association with the transfer curve processing process 4020 and/or the dynamic range enhancement process 4030 of the operation of the existing HDR video post-processing unit 2080. That is, an embodiment of the present invention may use the existing HDR video post-processing unit 2080 by adding a function for recognizing DR_transformation_curve_type and/or a coefficient according to a dynamic range mapping curve to the HDR video post-processing unit 2080 and adding a function for transforming a dynamic range, i.e., mapping a dynamic range, to the HDR video post-processing unit 2080.

Dynamic range mapping according to an embodiment of the present invention refers to mapping between a dynamic range of LDR video data and a dynamic range of HDR video data to perform transformation therebetween.

According to an embodiment of the present invention, when inverse dynamic range mapping is applied to HDR video data, which is dynamic range linearized in the transmitter, the receiver may apply an inverse function of an EOTF that has been applied in the transmitter for color encoding. The receiver may acquire information about the inverse function of the EOTF that has been applied to the transmitter, through LDR_EOTF_type described later. The information about the EOTF may be equal to information about an EOTF for a base layer transmitted by Video Usability Information (VUI).

According to an embodiment of the present invention, when an EOTF for the HDR video data should be applied after the inverse dynamic range mapping process, the receiver may signal a proper EOTF using HDR_EOTF_type described later.

According to the illustrated drawing, a function used by inverse dynamic range mapping may be a linear function 5010 or a piecewise non-linear curve 5020 varying with a dynamic range section. In this drawing, an x-axis may denote a dynamic range of LDR video data and a y-axis may denote a dynamic range of HDR video data. LDR_luminance_max and LDR_luminance_min may represent maximum and minimum dynamic range values of the LDR video data, respectively, and HDR_luminance_max and HDR_luminance_min may represent maximum and minimum dynamic range values of the HDR video data. intersection_x[0] and intersection_x[1] may represent x coordinates at which a function of the piecewise non-linear curve 5020 varying with a dynamic range section is changed and intersection_y[0] and intersection_y[1] may represent y coordinates 4at which the function of the piecewise non-linear curve 5020 varying with a dynamic range section is changed.

Figure 6:
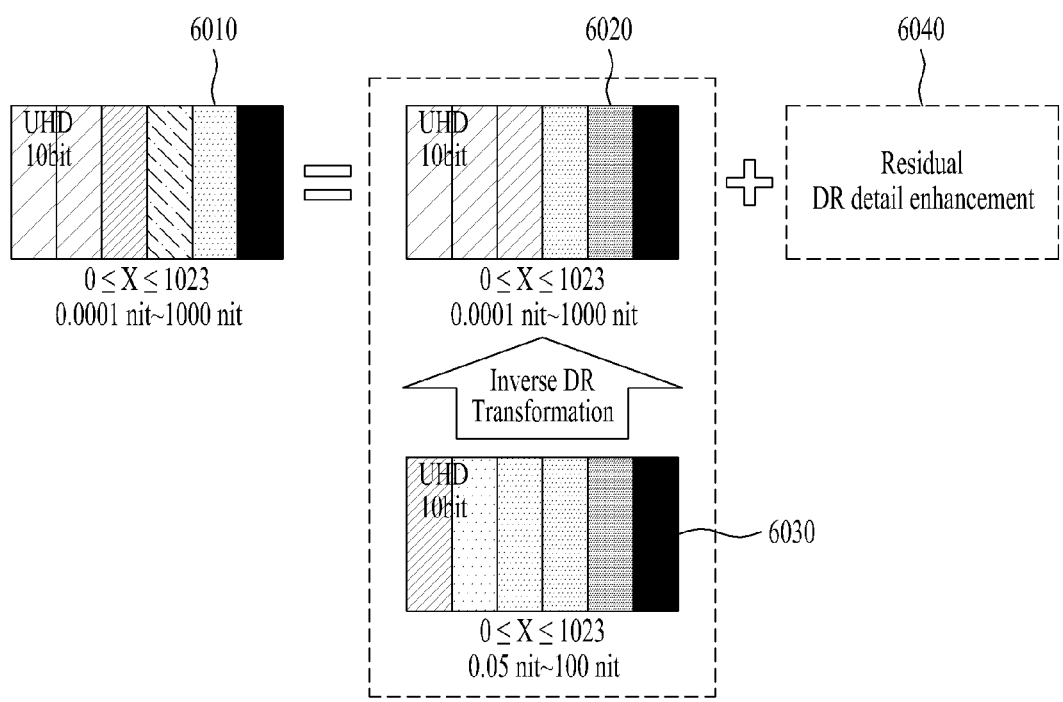
FIG. 6 is a diagram illustrating a relationship between HDR video data and LDR video data according to an embodiment of the present invention.

FIG. 6 is a diagram illustrating a relationship between HDR video data and LDR video data according to an embodiment of the present invention.

HDR video data 6010 according to an embodiment of the present invention may be acquired by adding residual information 6040 to HDR estimation video data 6020. The HDR estimation video data 6020 may be obtained by performing inverse dynamic range transformation on LDR video data.

The HDR video data 6010 and the HDR estimation video data 6020 according to an embodiment of the present invention may represent a luminance of 0.0001 nit to 1000 nit with a bit depth of 10 bits. The LDR video data 6030 may represent a luminance of 0.05 nit to 100 nit with a bit depth of 10 bits.

FIG. 7 is a diagram illustrating the configuration of a Program Map Table (PMT) according to an embodiment of the present invention.

The PMT according to an embodiment of the present invention includes a table_id field, a section_syntax_indicator field, a section_length field, a program_number field, a version_number field, a current_next_indicator field, a section_number field, a last_section_number field, a PCR_PID field, a program_info_length field, descriptor( ), a stream_type field, an elementary_PID field, an ES_info_length field, descriptor( ), and/or a CRC_32 field.

The table_id field identifies the type of a table. The table_id field may serve to indicate that a corresponding table section constitutes the PMT. (table_id is an 8-bit unsigned integer field is the first byte in every MPEG-2 private table is called the table_id. This single-byte value indicates the type of table. Table_id values are assigned by MPEG, ATSC, ARIB, SCTE or DVB specifications, and all leave room for table_ids that can be specified and defined by end users, which are called "user private" tables.)

The section_syntax_indicator field indicates the format of a table section that follows this field. If the value of the section_syntax_indicator field is 0, this indicates that the table section is a short format. If the value of the section_syntax_indicator field is 0, this indicates that the table section is a normal long format. (The first bit of the second byte in an MPEG-2 private table is the section_syntax_indicator. This single-bit value indicates the format of the table section to follow, as detailed in ISO/IEC 13818-1, Table 2-30, if this bit is set to zero, the table uses the short form. Most MPEG-2 PSI and ATSC PSIP table sections have this bit set to one, which means that the table follows the generic table syntax. If the former, private_data_bytes immediately follow the section_length field.)

The section_length field indicates the length of a corresponding table section. Since the section_length field indicates the length from this field to the end of the table section, an actual length of the table section may be a value obtained by adding 3 bytes to the value indicated by the section_length field. (The section_length field is a 12-bit field that gives the length of the table section beyond this field. Since it is carried starting at bit index 12 in the section (the second and third bytes), the actual size of the table section is section_length+3.)

The program_number field identifies each program service or a virtual channel within a transport stream. (The program_number is a 16-bit unsigned integer that uniquely identifies each program service (or virtual channel) present in a transport stream. Program numbers can range from 1 to 65535 and are generally allocated by end users by starting at 1.)

The version_number field indicates a version number of a private table section. A receiver may find out the latest section among table sections stored in a memory, using this field and the current_next_indicator field described later. (The version_number field is a 5-bit unsigned integer field that begins at bit index 50 in a table section and that signals the version number the private table section. Each time a table section changes, this field is incremented by 1. When the maximum value of 31 is exceeded, version_number wraps around to 0 (+1 modulo 32). Receivers are expected to monitor this field and current_next_indicator to insure the most recent table section is in memory. When current_next_indicator indicates a "next" section, the value of version_number is the value the next version of this section will carry. Depending on the table_id and specification publisher, the scope of version_number may vary.)

If the value indicated by the current_next_indicator field is 1, this indicates that a currently transmitted table is valid and if it is 0, this indicates that a currently transmitted table is invalid but will be valid later. (Some MPEG-2 private table sections permit the transmission of a "next" table section or sections to signal what a particular table will look like when it next changes. The MPEG-2 PSI tables that permit this are the PAT, CAT and PMT. ATSC tables that permit "next" editions include the TVCT, CVCT and SVCT. Most PSIP tables do not permit "next" editions. The version_number in the next edition of the table must be the version_number of the current edition, incremented by 1 modulo 32, and that must be the actual version number transmitted upon the next table section change.)

The section_number field indicates that a section number of a corresponding section in a corresponding table. (The section_number 8-bit unsigned integer field that begins at bit index 48 in a long-form private table section. The first section in a particular table is section_number=0 and each subsequent table section is incremented by 1, with a maximum of 255.)

The last_section_number field represents a number of the last section among sections constituting a corresponding table. (The last_section_number field is an 8-bit unsigned integer field that signals the last section that is valid for a particular MPEG-2 private table. It uses the same value basis as section_number, so the total number of sections is one greater than the value of this field. All of the table sections carry the same last_section_number.)

The PCR_PID field indicates an ID of a packet having a Program Clock Reference (PCR) for a program service. (The PCR_PID is the packet id where the program clock reference for a program service can be found. The program clock reference is used to reconstruct the 27 Mhz System Time Clock (STC) in the receiver, which is used to synchronize audio, video and data demodulation.)

The program_info_length field indicates the length of a descriptor representing program information that follows this field. (The program_info_length is a 12 bit mandatory field that starts at bit index 76 in a Program Map table section and signals the size of the variable-length program_info descriptor field to follow.)

The descriptor( ) indicates a descriptor representing information about a program related to a corresponding table section. (A descriptor( ) designation in a table denotes the location of a descriptor loop that may contain zero or more individual descriptors. A descriptor is a variable-length, generally optional field that may be found at one or more locations in an MPEG-2 private table section.) According to an embodiment of the present invention, descriptor( ) may be UD_program_descriptor having information about a UHD program. UD_program_descriptor will be described in detail later.

The stream_type field indicates a type of each elementary stream constituting a program that a corresponding table describes.

The elementary_PID field indicates a packet ID of each elementary stream constituting a program that a corresponding table describes. (The elementary_PID is the packet id indicated in a PMT section to fine a particular elementary stream)

The ES_info_length field indicates the length of a descriptor representing information about each elementary stream (ES_info) that follows this field. (The ES_info_length field is a 12-bit unsigned integer in a Program Map table (PMT) section that signals the size of the ES_info variable-length descriptor field that directly follows it. There is one ES_info_length field for each elementary stream listed in a program map table section.)

The descriptor( ) indicates a descriptor representing information about one elementary stream among elementary streams constituting a program that a corresponding table describes. (A descriptor( ) designation in a table denotes the location of a descriptor loop that may contain zero or more individual descriptors. A descriptor is a variable-length, generally optional field that may be found at one or more locations in an MPEG-2 private table section.) According to an embodiment of the present invention, descriptor( ) may be HDR_sub_stream_descriptor including information for decoding an enhancement layer. HDR_sub_stream_descriptor will be described in detail later.

The CRC_32 field indicates a CRC value used to confirm whether data included in a corresponding table section contains an error. (All MPEG-2 private table sections with the private_indicator set to one have a four-byte table section footer called the CRC-32, for 32-bit cyclic redundancy check. A CRC has a similar function to "parity checks" that were around in the first days of computers: a way of checking if data was transmitted correctly.)

According to an embodiment of the present invention, in order to transfer configuration information of scalable approach based HDR video data, information for decoding an enhancement layer stream is provided at a system level and HDR configuration information, i.e., metadata for mapping a dynamic range of LDR video data included in a base layer stream, may be provided through an SEI message at a video level.

According to an embodiment of the present invention, tier information, codec type information, profile information, and/or level information of the enhancement layer stream may be provided through HDR_sub_stream_descriptor included in the PMT. The tier information may be information for determining the limit of a bit rate of the enhancement layer stream, the profile information may indicate the characteristic of the enhancement layer stream, and the level information may indicate an application range of the characteristic of the enhancement layer stream. According to an embodiment of the present invention, maximum and minimum luminance information of original HDR video data and video related metadata such as a dynamic range mapping parameter (a parameter used for transformation of a dynamic range) may be provided through the SEI message. According to an embodiment of the present invention, the metadata provided through the SEI message may be referred to as HDR configuration information. The HDR configuration information may include information necessary to generate HDR estimation video data from LDR video data.

FIG. 8 is a diagram illustrating the configuration of UD_program_descriptor( ) according to an embodiment of the present invention.

The UD_program_descriptor( ) according to an embodiment of the present invention may include a descriptor_tag field, a descriptor_length field, and/or a UD_program_format_type field.

The descriptor_tag field may identify that this descriptor is UD_program_descriptor including information about a UHD program.

The descriptor_length field may indicate the length of the descriptor.

The UD_program_format_type field may indicate the type of a format of a program and/or a stream type of the program. According to an embodiment of the present invention, if the UD_program_format_type field is set to 0x09, this may indicate that the program has a stream consisting of a base layer for compatibility with LDR display and an enhancement layer for residual information necessary to configure HDR video data.

FIG. 9 is a diagram illustrating the configuration of a PMT in a stream unit according to an embodiment of the present invention.

According to an embodiment of the present invention, in one or more streams constituting one program, if stream_type is set to 0x24, this indicates that a corresponding stream is a stream encoded using an HEVC video code, wherein elementary_PID may be set to 0x109A and the contents of this stream may be included in HEVC_video_descriptor( ). If stream_type is set to 0xA1, this indicates that a corresponding stream is a stream encoded using an HEVC scalable layer video codec, wherein elementary_PID may be set to 0x109B and the contents of this stream may be included in HDR_sub_stream_descriptor( ). The HDR_sub_stream_descriptor( ) may include information about an enhancement layer according to an embodiment of the present invention and a detailed description thereof will be given later.

FIG. 10 is a diagram illustrating the configuration of HDR_sub_stream_descriptor( ) according to an embodiment of the present invention.

The HDR_sub_stream_descriptor( ) according to an embodiment of the present invention may include a descriptor_tag field, a descriptor_length field, an EL_video_codec_type field, an EL_video_profile field, an EL_video_level field, and/or an EL_video_tier field.

The descriptor_tag field may indicate a unique code value indicating that this descriptor is the HDR_sub_stream_descriptor( ).

The descriptor_length field may indicate an entire length of the descriptor.

The EL_video_codec_type field may have the same value as the stream_type field of the PMT and indicate a codec of a video element constituting an HDR video. That is, this field may indicate type information of a codec used in an enhancement layer stream.

The EL_video_profile field may indicate a profile of a corresponding video stream, i.e., a basic specification necessary to decode the stream. For example, the EL_video_profile field may indicate requirement information about bit depth (8 bits or 10 bits), a coding tool, etc. of the video stream. According to an embodiment of the present invention, this field may indicate profile information representing the characteristic of an enhancement layer stream.

The EL_video_level field may indicate a level for a corresponding video stream, i.e., a supported range of a technical element defined in the foregoing profile. According to an embodiment of the present invention, this field may indicate level information representing an application range of the characteristic of an enhancement layer stream and the level information may include information such as resolution, frame rate, bit rate, etc.

The EL_video_tier field may indicate tier information of a corresponding video stream. The tier information according to an embodiment of the present invention may indicate information used to determine the limit of the bit rate of an enhancement layer stream.

The HDR_sub_stream_descriptor( ) according to an embodiment of the present invention may include information for decoding the enhancement layer stream. The above-described fields may correspond to information for decoding the enhancement layer stream.

The HDR_sub_stream_descriptor( ) including the information for decoding the enhancement layer stream according to an embodiment of the present invention may correspond to a descriptor of a stream level of a PMT and may be included in a PMT, an SDT, an EIT, a TVCT, and/or a CVCT, which will be described later.

FIG. 11 is a diagram illustrating the configuration of a payload of a Supplemental Enhancement Information (SEI) message according to an embodiment of the present invention.

The SEI message according to an embodiment of the present invention may include UDTV_scalable_dynamic_range_service_info( ) when a payload type is 52 (payload type ==52) and details of the UDTV_scalable_dynamic_range_service_info( ) will be described later.

FIG. 12 is a diagram illustrating the configuration of UDTV_scalable_dynamic_range_service_info( ) according to an embodiment of the present invention.

The UDTV_scalable_dynamic_range_service_info( ) according to an embodiment of the present invention may include a UD_program_format_type field and/or HDR_substream_metadata( ).

The UD_program_format_type field may indicate a type of the format of a program and/or a type of a stream constituting a corresponding program. According to an embodiment of the present invention, if the UD_program_format_type field is set to 0x09, this may indicate that a corresponding program is a program having a stream consisting of a base layer for compatibility with an LDR display and an enhancement layer for residual information necessary to configure HDR video data.

If the UD_program_format_type field according to an embodiment of the present invention is set to 0x09, UDTV_scalable_dynamic_range_service_info( ) may include HDR_substream_metadata( ) and the HDR_substream_metadata( ) may include information necessary to generate HDR estimation video data from LDR video data in a receiver. The HDR_substream_metadata( ) according to an embodiment of the present invention may be referred to as HDR configuration information. Details of the HDR_substream_metadata( ) will be described later.

FIG. 13 is a diagram illustrating the configuration of HDR_substream_metadata( ) according to an embodiment of the present invention.

The HDR_substream_metadata( ) according to an embodiment of the present invention may include an original_UD_video_type field, an LDR_dynamic_range_type field, an HDR_dynamic_range_type field, an LDR_luminance_max field, an LDR_luminance_min field, an HDR_luminance_max field, an HDR_luminance_min field, an LDR_EOTF_type field, an HDR_EOTF_type field, a number_of_coeff field, an LDR_EOTF_coeff[i] field, a number_of_coeff field, an HDR_EOTF_coeff[i] field, a DR_transformation_curve_type field, and/or DR_fransformation_curve( ).

The original_UD_video_type field may indicate information about a Ultra Definition (UD) video format of a base layer. This field may indicate basic information such as resolution and/or frame rate of a video and a detailed description thereof will be given later.

The LDR_dynamic_range_type field may signal a dynamic range of base layer video data, i.e., a dynamic range of LDR video data. According to an embodiment of the present invention, if the LDR_dynamic_range_type field is set to 0001, this indicates that the dynamic range of the LDR video data may have the luminance range of a reference monitor established in Society of Motion Picture and Television Engineers (SMPTE) and the other values may be used according to a standard to be established later. According to an embodiment of the present invention, if the LDR_dynamic_range_type field is set to 1000, this indicates that the dynamic range of the LDR video data has a random value and the dynamic range of the LDR video data may be determined by LDR_luminance_max and LDR_luminance_min fields described later. According to an embodiment of the present invention, the LDR_dynamic_range_type field may be referred to as LDR dynamic range type information.

The HDR_dynamic_range_type field may signal a dynamic range of video data to be reproduced through an enhancement layer, i.e., a dynamic range of HDR video data. According to an embodiment of the present invention, if the value of the HDR_dynamic_range_type field is 0001, this indicates that the dynamic range of the HDR video data may have the luminance range of a reference monitor established in SMPTE and the other values may be used according to a standard to be established later. According to an embodiment of the present invention, if the value of the HDR_dynamic_range_type field is 1000, this indicates that the dynamic range of the HDR video data has a random value and the dynamic range of the HDR video data may be determined by HDR_luminance_max and HDR_luminance_min fields described later. According to an embodiment of the present invention, the HDR_dynamic_range_type field may be referred to as HDR dynamic range type information.

The LDR_luminance_max field may be used when maximum reference luminance represented in the LDR video data is designated as a random value. This field may indicate a maximum value of a dynamic range expressed in the LDR video data and transmit a quotient obtained by dividing an actual value by 100 (decimal number) in consideration of a normal range.

The LDR_luminance_min field may be used when minimum reference luminance represented in the LDR video data is designated as a random value. This field may indicate a minimum value of a dynamic range represented in the LDR video data and transmit a value obtained by multiplying an actual value by 100 (decimal number) in consideration of a normal range.

The HDR_luminance_max field may be used when maximum reference luminance represented in the HDR video data is designated as a random value. This field may indicate a maximum value of a dynamic range expressed in the HDR video data and transmit a quotient obtained by dividing an actual value by 100 (decimal number) in consideration of a normal range.

The HDR_luminance_min field may be used when minimum reference luminance represented in the HDR video data is designated as a random value. This field may indicate a minimum value of a dynamic range represented in the HDR video data and transmit a value obtained by multiplying an actual value by 100 (decimal number) in consideration of a normal range.

The LDR_EOTF_type field may indicate a type of an EOTF used to encode the LDR video data in a transmitter. Generally, widely used EOTFs such as ITU-R BT.1886, REC.709, BT.2020, etc. may be transmitted by VUI information and, in this case, the value of this field may designate the same EOTF as an EOTF transmitted by the VUI information. If an EOTF which is not determined by a standard is used (e.g., perceptual quantization), this field is set to 0001 and information about a random EOTF may be signaled by the number_of_coeff field and/or the LDR_EOTF_coeff[i] field described later. An EOTF indicated by the LDR_EOTF_type field according to an embodiment of the present invention may be used to color-encode the LDR video data.

The HDR_EOTF_type field may indicate a type of an EOTF used to transform the LDR video data into the HDR video data and then to encode the transformed HDR video data in the transmitter. The transmitter may not generally require additional EOTF processing but the EOTF may be needed when the receiver is separated or according to a display type. Generally, widely used EOTFs such as ITU-R BT.1886, REC.709, BT.2020, etc. may be transmitted by VUI information and, in this case, the value of this field may designate the same EOTF as an EOTF transmitted by the VUI information. If an EOTF which is not determined by a standard is used (e.g., perceptual quantization), this field is set to 0001 and information about a random EOTF may be signaled by the number_of_coeff field and/or the HDR_EOTF_coeff[i] field described later. An EOTF indicated by the HDR_EOTF_type field according to an embodiment of the present invention may be used to color-encode the HDR video data.

The number_of_coeff field may indicate the number of coefficients for representing a random EOTF used to encode the LDR video data and/or the HDR video data in the transmitter.

The LDR_EOTF_coeff[i] field may indicate an (i+1)-th coefficient for representing a random EOTF used to encode the LDR video data, wherein i may be a value equal to or greater than 0 and less than the value of the number of coeff field.

The HDR_EOTF_coeff[i] field may indicate an (i+1)-th coefficient for representing a random EOTF used to encode the HDR video data, wherein i is a value equal to or greater than 0 and less than the value of the number_of_coeff field.

The DR_transformation_curve_type field may indicate a type of a dynamic range transformation curve used in the transmitter. That is, this field may indicate a type of a transformation curve used to transform a dynamic range of the LDR video data into HDR estimation video data and a detailed description thereof will be given later.

The DR_transformation_curve( ) may indicate information about a dynamic range transformation function according to the foregoing DR_transformation_curve_type field. That is, this field may indicate detailed information about a transformation function or curve used to transform the dynamic range of the LDR video data into the HDR estimation video data, and a detailed description thereof will be given later.

The HDR_substream_metadata( ) according to an embodiment of the present invention may include information that has been used to transform a dynamic range of the original HDR video data into the LDR video data in the transmitter. The HDR_substream_metadata( ) may be referred to as HDR configuration information. If the transmitter inversely transforms the LDR video data into the HDR estimation video data, the HDR_substream_metadata( ) may be used when the receiver inversely transforms the LDR video data into the HDR estimation video data.

According to an embodiment of the present invention, the term transformation or inverse transformation, which is used when a dynamic range is transformed or inversely transformed, is interchangeably used if an object and a subject of transformation is changed.

FIG. 14 is a diagram illustrating the configuration of DR_transformation_curve( ) according to an embodiment of the present invention.

If DR_transformation_curve_type according to an embodiment of the present invention is set to 0x00, this indicates that a linear function may be used as a dynamic range transformation function and, in this case, a gain and/or offset value of the linear function may be signaled according to an embodiment of the present invention.

If DR_transformation_curve_type according to an embodiment of the present invention is set to 0x01, this indicates that a logarithmic function may be used as the dynamic range transformation function and, in this case, a gain, offset, and/or coeff_a value of the logarithmic function may be signaled according to an embodiment of the present invention.

If DR_transformation_curve_type according to an embodiment of the present invention is set to 0x02, this indicates that an exponential function may be used as the dynamic range transformation function and, in this case, a gain, offset, and/or coeff_a value of the exponential function may be signaled according to an embodiment of the present invention.

If DR_transformation_curve_type according to an embodiment of the present invention is set to 0x03, this indicates that an inverse s-curve may be used as the dynamic range transformation function and, in this case, an intersection_x, gain1, gain2, offset1, offset2, coeff_a1, and/or coeff_a2 value of the inverse s-curve may be signaled according to an embodiment of the present invention.

The gain, offset, coeff_a, intersection_x, gain1, gain2, offset1, offset2, coeff_a1, and coeff_a2 value according to an embodiment of the present invention may indicate coefficient(s) or parameter(s) of the dynamic range transformation function or curve which will be described later.

FIG. 15 is a diagram illustrating the configuration of DR_transformation_curve( ) according to an embodiment of the present invention.

If DR_transformation_curve_type according to an embodiment of the present invention is set to 0x04, this indicates that a piecewise non-linear curve varying with a dynamic range section may be used as a dynamic range transformation function and, in this case, number_section indicating the number of sections between respective sections in which different functions are used may be signaled and the above-described coefficients or parameters may be signaled according to a type of a transformation function used in each section, according to an embodiment of the present invention. For example, when a dynamic range is divided into two sections and two different transformation functions are used, number_section is set to 1 and coefficients (gain, offset, and/or intersection) necessary for a transformation function applied to each section may be signaled.

If DR_transformation_curve_type according to an embodiment of the present invention is set to 0x05, a look-up table may be used to transform a dynamic range. In this case, according to an embodiment of the present invention, an entry_length field indicating the length of an entry included in the look-up table may be signaled and in_value indicating a value input to the look-up table and/or an out_value field indicating a value output from the look-up table may be signaled. According to an embodiment of the present invention, only out_value corresponding to in_vlaue may be signaled and, if it is desired to transform all luminance ranges, in_value may not be signaled. According to an embodiment of the present invention, when out_value is signaled, only a difference of luminance values may be signaled.

In this drawing, intersection_x[i] may indicate an x coordinate of a section boundary at which a type of a used transformation function is changed and intersection_y[i] may indicate a y coordinate of a section boundary at which a type of a used transformation function is changed.

gain[i], offset[i], coeff_a[i], intersection_x[i], and intersection_y[i] according to an embodiment of the present invention may indicate coefficients or parameters used for the dynamic range transformation function or curve described later.

FIG. 16 is a diagram illustrating original_UD_video_type according to an embodiment of the present invention.

original_UD_video_type according to an embodiment of the present invention may be referred to as UD_video_type and original_UD_video_type may indicate information about a UD video format of a base layer. This field may indicate basic information such as resolution and/or frame rate of a video.

According to an embodiment of the present invention, if UD_video_type a is 0011, this may indicate that a corresponding video has a resolution of 3840×2160 and a frame rate of 60p; if UD_video_type is set to 0100, this may indicate that a corresponding video has a resolution of 3840×2160 and a frame rate of 120p; if UD_video_type is set to 0101, this may indicate that a corresponding video has a resolution of 4096×2160 and a frame rate of 60p; if UD_video_type is set to 0110, this may indicate that a corresponding video has a resolution of 4096×2160 and a frame rate of 120p; if UD_video_type is set to 01111, this may indicate that a corresponding video has a resolution of 7680×4320 and a frame rate of 60p; if UD_video_type is set to 1000, this may indicate that a corresponding video has a resolution of 7680×4320 and a frame rate of 120p; if UD_video_type is set to 1001, this may indicate that a corresponding video has a resolution of 8192×4320 and a frame rate of 60p; and if UD_video_type is set to 1010, this may indicate that a corresponding video has a resolution of 8192×4320 and a frame rate of 120p.

FIG. 17 is a diagram illustrating a dynamic range type used in LDR_dynamic_range_type and/or HDR_dynamic_range_type according to an embodiment of the present invention.

According to an embodiment of the present invention, if the value of an LDR_dynamic_range_type and/or an HDR_dynamic_range_type field is 0001, this may indicate that a dynamic range of LDR and/or HDR video data has a luminance range of a reference monitor established in SMPTE and the other values nay be used according to a standard to be established later. According to an embodiment of the present invention, if the value of the LDR_dynamic_range_type and/or the HDR_dynamic_range_type field is 1000, this may indicate that the dynamic range of LDR and/or HDR video data has a random value.

FIG. 18 is a diagram illustrating LDR_EOTF_type according to an embodiment of the present invention.

The LDR_EOTF_type field according to an embodiment of the present invention may indicate a type of an EOTF that has been used to encode LDR video data in a transmitter.

According to an embodiment of the present invention, if the value of the LDR_EOTF_type field is 0010, this may indicate that an EOTF determined in ITUR BT.1886 is used; if the value of the LDR_EOTF_type field is 0011, this may indicate that an EOTF determined in ITU_R REC.709 is used; and if the value of the LDR_EOTF_type field is 0100, this may indicate that an EOTF determined in ITUR BT.2020 is used. In addition, if the value of the LDR_EOTF_type field is 0001, this may indicate that a random EOTF which is not determined in a standard is used and, in this case, information about the random EOTF may be signaled by the above-described number_of_coeff field and/or LDR_EOTF_coeff[i] field. In addition, the other values may be used according to a standard to be established later.

FIG. 19 is a diagram illustrating HDR_EOTF_type according to an embodiment of the present invention.

The HDR_EOTF_type field according to an embodiment of the present invention may indicate a type of an EOTF that has been used to transform LDR video data into HDR video data and then to encode the transformed HDR video data in a transmitter.

According to an embodiment of the present invention, if the value of the HDR_EOTF_type field is 0010, this may indicate that an EOTF determined in ITUR BT.1886 is used; if the value of the HDR_EOTF_type field is 0011, this may indicate that an EOTF determined in ITU_R REC.709 is used; and if the value of the HDR_EOTF_type field is 0100, this may indicate that an EOTF determined in ITUR BT.2020 is used. In addition, if the value of the HDR_EOTF_type field is 0001, this may indicate that a random EOTF which is not determined in a standard is used and, in this case, information about the random EOTF may be signaled by the above-described number_of_coeff field and/or HDR_EOTF_coeff[i] field. The other values may be used according to a standard to be established later. In addition, if the value of the HDR_EOTF_type is 0000, this may indicate that an additional EOTF for the HDR video data is not used in the transmitter.

FIG. 20 is a diagram illustrating DR_transformation_curve_type according to an embodiment of the present invention.

The DR_transformation_curve_type field according to an embodiment of the present invention may indicate a type of a dynamic range transformation curve that has been used in a transmitter.

According to an embodiment of the present invention, if DR_transformation_curve_type is set to 0x00, this may indicate that a linear function is used as a dynamic range transformation function; if DR_transformation_curve_type is set to 0x01, this may indicate that a logarithmic function is used as the dynamic range transformation function; if DR_transformation_curve_type is set to 0x 02, this may indicate that an exponential function is used as the dynamic range transformation function; if DR_transformation_curve_type is set to 0x03, this may indicate that an inverse s-curve is used as the dynamic range transformation function; if DR_transformation_curve_type is set to 0x04, this may indicate that a piecewise non-linear curve varying with a dynamic range section is used as the dynamic range transformation function; and if DR_transformation_curve_type is set to 0x05, this may indicate that a look-up table is used for transformation of a dynamic range. In addition, the other values may be used to signal the transformation function or curve.

FIG. 21 is a diagram illustrating an equation of a dynamic range transformation function (DR_transformation_curve) according to an embodiment of the present invention.

If a linear function 21010 is used as the dynamic range transformation function (DR_transformation_curve) according to an embodiment of the present invention, an output dynamic range (out) may be a value obtained by adding an offset to the product of an input dynamic range (in) and gain. The gain and/or offset value may be signaled by fields constituting DR_transformation_curve( ).

If an exponential function 21020 is used as the dynamic range transformation function (DR_transformation_curve) according to an embodiment of the present invention, the output dynamic range (out) may be calculated by an equation (21020) of this drawing, wherein 'in' denotes an input dynamic range and a gain, coeff_a, and/or offset value may be signaled by the fields constituting DR_transformation_curve( ).

If a logarithmic function 21030 is used as the dynamic range transformation function (DR_transformation_curve) according to an embodiment of the present invention, the output dynamic range (out) may be calculated by an equation (21030) of this drawing, wherein 'in' denotes an input dynamic range and a gain, coeff_a, and/or offset value may be signaled by the fields constituting DR_transformation_curve( ).

An inverse s-curve 21040 is used as the dynamic range transformation function (DR_transformation_curve) according to an embodiment of the present invention, the output dynamic range (out) may be calculated by the equation (21040) of this drawing. More specifically, if the input dynamic range (in) is less than intersection_x, the logarithmic function may be used and, if the input dynamic range (in) is greater than or equal to intersection_x, the exponential function may be used. In this case, 'in' denotes the input dynamic range and a gain1, gain2, coeff_a1, coeff_a2, offset1, offset2, and/or intersection_x value may be signaled by the fields constituting DR_transformation_curve( ).

A piecewise non-linear curve 21050 varying with a dynamic range section is used as the dynamic range transformation function (DR_transformation_curve), the output dynamic range (out) may be calculated by the equation (21030) of this drawing. According to an embodiment of the present invention, if the input dynamic range (in) is less than intersection_x[0], the logarithmic function may be used and, if the input dynamic range (in) is greater than or equal to intersection_x[0] and less than intersection_x[1], the linear function may be used. If the input dynamic range (in) is greater than or equal to intersection_x[1], the exponential function may be used. In this case, 'in' denotes the input dynamic range and gain1, gain2, gain3, coeff_a1, coeff_a3, offset1, offset2, offset3, intersection_x[0], and/or intersection_x[1] may be signaled by the fields constituting DR_transformation_curve( ).

According to an embodiment of the present invention, the output dynamic range (out) may be the dynamic range of LDR video data and the input dynamic range (in) may be the dynamic range of original HDR video data. Conversely, according to an embodiment of the present invention, the output dynamic range may be the dynamic range of HDR video data or HDR estimation video data and the input dynamic range may be the dynamic range of the LDR video data.

FIG. 22 is a diagram illustrating the configuration of HDR_sub_stream_descriptor( ) according to an embodiment of the present invention.

According to an embodiment of the present invention, in order to transfer configuration information of HDR video data based on a scalable approach, not only information for decoding an enhancement layer stream but also HDR configuration information, i.e., metadata for mapping a dynamic range of LDR video data included in a base layer stream, may be provided at the system level. While the HDR configuration information has been provided through an SEI message at the video level according to the foregoing embodiment of the present invention, the HDR configuration information according to another embodiment of the present invention may be included in a PMT and signaled at the system level.

The HDR_sub_stream_descriptor( ) according to an embodiment of the present invention may be included in the PMT as a descriptor of a stream level of the PMT and may include metadata for mapping the dynamic range of LDR video data included in a base layer stream as well as information for decoding an enhancement layer.

The HDR_sub_stream_descriptor( ) according to an embodiment of the present invention may include a descriptor_tag field, a descriptor_length field, an EL_video_codec_type field, an EL_video_profile field, an EL_video_level field, an EL_video_tier field, and/or an HDR_substream_metadata( ).

The descriptor_tag field may indicate a unique code value representing that a corresponding descriptor is the HDR_sub_stream_descriptor( ).

The descriptor_length field may indicate an entire length of the descriptor.

The EL_video_codec_type field may have the same value as a stream_type field of a PMT and indicate a codec of a video element constituting an HDR video. That is, this field may indicate type information of a codec used in an enhancement layer stream.

The EL_video_profile field may indicate a profile for a corresponding video stream, i.e., a basic specification needed to decode the stream. For example, this field may indicate requirement information about bit depth (8 bits or 10 bits), a coding tool of the video stream. According to an embodiment of the present invention, this field may indicate profile information representing the characteristic of the enhancement layer stream.

The EL_video_level field may indicate a level for a corresponding video stream, i.e., a supported range of a technical element defined in the foregoing profile. According to an embodiment of the present invention, this field may indicate level information representing an application range of the characteristic of an enhancement layer stream and the level information may include information such as resolution, frame rate, bit rate, etc.

The EL_video_tier field may indicate tier information of a corresponding video stream. The tier information according to an embodiment of the present invention may indicate information used to determine the limit of the bit rate of an enhancement layer stream.

The HDR_substream_metadata( ) may include information that has been used to transform a dynamic range of the original HDR video data into LDR video data in the transmitter. The HDR_substream_metadata( ) may be referred to as HDR configuration information. If the transmitter inversely transforms the LDR video data into HDR estimation video data, the HDR_substream_metadata( ) may be used when the receiver inversely transforms the LDR video data into the HDR estimation video data. For a detailed description of the HDR_substream_metadata( ), refer to the description of the drawing illustrating the configuration of the above-described HDR_substream_metadata( ).

The HDR_sub_stream_descriptor( ) according to an embodiment of the present invention may include information for decoding the enhancement layer stream. The HDR_sub_stream_descriptor( ) according to an embodiment of the present invention may correspond to a descriptor of a stream level of a PMT and may be included in a PMT, an SDT, an EIT, a TVCT, and/or a CVCT, which will be described later.

FIG. 23 is a diagram illustrating the configuration of a Service Description Table (SDT) according to an embodiment of the present invention.

The SDT according to an embodiment of the present invention includes a table_id field, a section_syntax_indicator field, a section_length field, a transport_stream_id field, a version_number field, a current_next_indicator field, a section_number field, a last_section_number field, an original_network_id field, a service_id field, an EIT_schedule_flag field, an EIT_present_following_flag field, a running_status field, a free_CA_mode field, a descriptors_loop_length field, a descriptor( ), and/or a CRC_32 field.

The table_id field identifies a type of a table. The table_id field may serve to indicate that a corresponding table section is a section constituting the SDT.

The section_syntax_indicator field indicates the format of a table section that follows this field. If the value of the section_syntax_indicator field is 0, this indicates that the table section is short format. If the value of the section_syntax_indicator field is 0, this indicates that the table section is normal long format. (The section_syntax_indicator is a 1-bit field which can be set to "1".)

The section_length field indicates the length of a corresponding table section. The section_length field may indicate the length from this field to the end of the table section. (This is a 12-bit field, the first two bits of which can be "00". It specifies the number of bytes of the section, starting immediately following the section_length field and including the CRC.)

The transport_stream_id field identifies a Transport Stream (TS) that a corresponding table describes. (This is a 16-bit field which serves as a label for identification of the TS, about which the SDT informs, from any other multiplex within the delivery system.)

The version_number field indicates a version number of a private table section. A receiver may find out the latest section among table sections stored in a memory, using this field and the current_next_indicator field described later. (This 5-bit field is the version number of the sub_table. The version_number can be incremented by 1 when a change in the information carried within the sub_table occurs. When it reaches value "31", it wraps around to "0". When the current_next_indicator is set to "1", then the version_number can be that of the currently applicable sub_table. When the current_next_indicator is set to "0", then the version_number can be that of the next applicable sub_table.)

If the value indicated by the current_next_indicator field is 1, this indicates that a currently transmitted table is valid and if it is 0, this indicates that a currently transmitted table is invalid but will be valid later. (This 1-bit indicator, when set to "1" indicates that the sub_table is the currently applicable sub_table. When the bit is set to "0", it indicates that the sub_table sent is not yet applicable and can be the next sub_table to be valid.)

The section_number field indicates a section number of a corresponding section in a corresponding table. (This 8-bit field gives the number of the section. The section_number of the first section in the sub_table can be "0x00". The section_number can be incremented by 1 with each additional section with the same table_id, transport_stream_id, and original_network_id.)

The last section_number field represents a number of the last section among sections constituting a corresponding table. (This 8-bit field specifies the number of the last section (that is, the section with the highest section_number) of the sub_table of which this section is part.)

The original_network_id field may identify the first broadcaster that has transmitted a service described in a corresponding table. (This 16-bit field gives the label identifying the network_id of the originating delivery system.)

The service_id field identifies each service present in a TS. The service_id field may have the same function as the program_number field in the PMT. (This is a 16-bit field which serves as a label to identify this service from any other service within the TS. The service_id is the same as the program_number in the corresponding program_map_section.)

If the value of the EIT_schedule_flag field is 1, this indicates that EIT scheduling information (EIT schedule flag) is currently present in a TS and, if the value of the EIT_scheduleflag field is 0, this indicates that the EIT scheduling information is not present. (This is a 1-bit field which when set to "1" indicates that EIT schedule information for the service is present in the current TS.)

If the value of the EIT_present_following_flag field is 1, this indicates that EIT_present_following information for a service is present in a current TS and, if it is 0, this indicates that the EIT_present_following information is not present. (This is a 1-bit field which when set to "1" indicates that EIT_present_following information for the service is present in the current TS.)

The running_status field indicates the status of a service. For example, if the value of the running_status field is 1, this may indicate that a service is "not running"; if the value of the running_status field is 2, this may indicate that a service "starts in a few seconds"; if the value of the running_status field is 3, this may indicate that a service is "pausing"; if the value of the running_status field is 4, this may indicate that a service is "running"; and if the value of the running_status field is 5, this may indicate "service off-air".

If the value of the free_CA_mode field is 0, this indicates that component streams constituting a service are not scrambled and, if the value of the free_CA_mode field is 1, this indicates that access to one or more streams is controlled by a CA system. The CA (Conditional Access) system refers to a system for providing an encryption function of broadcast content in order to restrict viewing of a broadcast to a contractor and a function for enabling only the contractor to view broadcast content by decrypting a code. (This 1-bit field, when set to "0" indicates that all the component streams of the service are not scrambled. When set to "1" it indicates that access to one or more streams may be controlled by a CA system.)

The descriptors_loop_length field indicates a value obtained by adding the lengths of descriptors that follow this field to each other. (This 12-bit field gives the total length in bytes of the following descriptors.)

The descriptor( ) indicates a descriptor describing each service. The above-described UD_program_descriptor and/or HDR_sub_stream_descriptor according to an embodiment of the present invention may be included in this descriptor. If the HDR_sub_stream_descriptor is included in this descriptor, a component_tag field may be added. In addition, the above-described HDR_substream_metadata or a subset thereof may be included in this descriptor.

The CRC_32 field indicates a CRC value used to check whether data included in this table section contains an error. (This is a 32-bit field that contains the CRC value that gives a zero output of the registers in the decoder after processing the entire section.)

FIG. 24 is a diagram illustrating the configuration of an Event Information Table (EIT) according to an embodiment of the present invention.

The EIT according to an embodiment of the present invention includes a table_id field, a section_syntax_indicator field, a section_length field, a service_id field, a version_number field, a current_next_indicator field, a section_number field, a last_section_number field, a transport_stream_id field, an original_network_id field, a segment_last_section_number field, a last_table_id field, an event_id field, a start time field, a duration field, a running_status field, a free_CA_mode field, a descriptors_loop_length field, a descriptor( ), and/or a CRC_32 field.

The table_id field identifies a type of a table. The table_id field may serve to indicate that a corresponding table section is a section constituting the EIT.

The section_syntax_indicator field indicates the format of a table section that follows this field. If the value of the section_syntax_indicator field is 0, this indicates that the table section is short format. If the value of the section_syntax_indicator field is 0, this indicates that the table section is normal long format. (The section_syntax_indicator is a 1-bit field which can be set to "1".)

The section_length field indicates the length of a corresponding table section. The section_length field may indicate the length from this field to the end of the table section. (This is a 12-bit field. It specifies the number of bytes of the section, starting immediately following the section_length field and including the CRC. The section_length can not exceed 4 093 so that the entire section has a maximum length of 4 096 bytes.)

The service_id field identifies each service present in a TS. The service_id field may have the same function as the program_number field in the PMT. (This is a 16-bit field which serves as a label to identify this service from any other service within a TS. The service_id is the same as the program_number in the corresponding program_map_section.)

The version_number field indicates a version number of a private table section. A receiver may find out the latest section among table sections stored in a memory, using this field and the current_next_indicator field. (This 5-bit field is the version number of the sub_table. The version_number can be incremented by 1 when a change in the information carried within the sub_table occurs. When it reaches value 31, it wraps around to 0. When the current_next_indicator is set to "1", then the version_number can be that of the currently applicable sub_table. When the current_next_indicator is set to "0", then the version_number can be that of the next applicable sub_table.)

If the value indicated by the current_next_indicator field is 1, this indicates that a currently transmitted table is valid and, if the current_next_indicator field is set to 0, this indicates that a currently transmitted table is invalid but will be valid later. (This 1-bit indicator, when set to "1" indicates that the sub_table is the currently applicable sub_table. When the bit is set to "0", it indicates that the sub_table sent is not yet applicable and can be the next sub_table to be valid.)

The section_number field indicates a section number of a corresponding section in a corresponding table. (This 8-bit field gives the number of the section. The section_number of the first section in the sub_table can be "0x00". The section_number can be incremented by 1 with each additional section with the same table_id, service_id, transport_stream_id, and original_network_id. In this case, the sub_table may be structured as a number of segments. Within each segment the section_number can increment by 1 with each additional section, but a gap in numbering is permitted between the last section of a segment and the first section of the adjacent segment.)

The last_section_number field represents a number of the last section among sections constituting a corresponding table. (This 8-bit field specifies the number of the last section (that is, the section with the highest section_number) of the sub_table of which this section is part.)

The transport_stream_id field identifies a TS that a corresponding table desires to describe. (This is a 16-bit field which serves as a label for identification of the TS, about which the EIT informs, from any other multiplex within the delivery system.)

The original_network_id field may identify the first broadcaster that has transmitted a service described in a corresponding table. (This 16-bit field gives the label identifying the network_id of the originating delivery system.)

The segment_last_section_number field indicates the last section number when a sub table is present. If the sub table is not segmented, the value of this field may be the same as the value of the last_section_number field. (This 8-bit field specifies the number of the last section of this segment of the sub_table. For sub_tables which are not segmented, this field can be set to the same value as the last_section_number field.)

The last_table_id field indicates last table_id used. (This 8-bit field identifies the last table_id used (see table 2). If only one table is used this is set to the table_id of this table. The chronological order of information is maintained across successive table_id values.)

The event_id field identifies each event and has a unique value in one service. (This 16-bit field contains the identification number of the described event (uniquely allocated within a service definition).)

The start_time field indicates the start time of a corresponding event. (This 40-bit field contains the start time of the event in Universal Time, Co-ordinated (UTC) and Modified Julian Date (MJD). This field is coded as 16 bits giving the 16 LSBs of MJD followed by 24 bits coded as 6 digits in 4-bit Binary Coded Decimal (BCD). If the start time is undefined (e.g. for an event in a NVOD reference service) all bits of the field are set to "1".)

The duration field indicates a duration of a corresponding event. For example, if a program continues for 1 hour, 45 minutes and 30 seconds, the duration field may indicate 0x014530. (A 24-bit field containing the duration of the event in hours, minutes, seconds.)

The running_status field indicates the status of a corresponding event. (This is a 3-bit field indicating the status of the event as defined in table 6. For an NVOD reference event the value of the running_status can be set to "0".)

If the value of the free_CA_mode field is 0, this indicates that component streams constituting a service are not scrambled and, if the value of the free_CA_mode field is 1, this indicates that access to one or more streams is controlled by a CA system. The CA (Conditional Access) system refers to a system for providing an encryption function of broadcast content in order to restrict viewing of a broadcast to a contractor and a function for enabling only the contractor to view the broadcast content by decrypting a code. (This 1-bit field, when set to "0" indicates that all the component streams of the event are not scrambled. When set to "1" it indicates that access to one or more streams is controlled by a CA system.)

The descriptors_loop_length field indicates a value obtained by adding the lengths of descriptors that follow this field to each other. (This 12-bit field gives the total length in bytes of the following descriptors.)

The descriptor( ) indicates a descriptor describing each service. The above-described UD_program_descriptor and/or HDR_sub_stream_descriptor according to an embodiment of the present invention may be included in this descriptor. If the HDR_sub_stream_descriptor is included in this descriptor, a component_tag field may be added. In addition, the above-described HDR_substream_metadata or a subset thereof may be included in this descriptor.

The CRC_32 field indicates a CRC value used to check whether data included in this table section has an error. (This is a 32-bit field that contains the CRC value that gives a zero output of the registers in the decoder after processing the entire section.)

FIG. 25 is a diagram illustrating the configuration of a Terrestrial Virtual Channel Table (TVCT) according to an embodiment of the present invention.

The TVCT according to an embodiment of the present invention may include a table_id field, a section_syntax_indicator field, a private_indicator field, a section_length field, a transport_stream_id field, a version_number field, a current_next_indicator field, a section_number field, a last_section_number field, a protocop_version field, a num_channels_in_section field, a short_name field, a major_channel_number field, a minor_channel_number field, a modulation mode field, a carrier_frequency field, a channel_TSID field, a program_number field, an ETM_location field, an access_controlled field, a hidden field, a hide_guide field, a service_type field, a source_id field, a descriptors_length field, and/or a descriptor( ).

The table_id field identifies a table.

The section_syntax_indicator field is a 1-bit field set to 1to indicate the long form of an MPEG-2 private_section table. (This 1-bit field can be set to '1' to always indicate the "long" form of the MPEG-2 private_section table.)

The private_indicator field is a 1-bit field set to 1. (This 1-bit field can be set to '1'.)

The section_length field indicates the length of table sections in bytes that follows this field. (This is a 12-bit field, the first two bits of which can be "00". It specifies the number of bytes of the section, starting immediately following the section_length field and including the CRC. The section_length can not exceed 1 021 so that the entire section has a maximum length of 1 024 bytes.)

The transport_stream_id field indicates an ID of an MPEG-2 TS in a table. (To distinguish each transport stream within a single network (terrestrial, cable or satellite) from another, MPEG-2 established the use of a 16-bit (ranging from 0 to 65535) transport_stream_identifier, which is also called a TSID.)

The version_number field is a 5-bit field indicating a version number of a table. (This 5-bit field is the version number of the PSIP_section. The version_number can be incremented by 1 modulo 32 when a change in the information carried within the PSIP_section occurs. When the current_next_indicator is set to '0', then the version_number can be that of the next applicable PSIP_section with the same table_id, table_id_extension, and section_number.)

The current_next_indicator field is a 1-bit field indicating whether the table is currently applicable or next applicable. (A 1-bit field, which when set to '1' indicates that the PSIP_section sent is currently applicable. When the current_next_indicator is set to '1', then the version_number can be that of the currently applicable PSIP_section. When the bit is set to '0', it indicates that the PSIP_section sent is not yet applicable and can be the next PSIP_section with the same section_number, table_id_extension, and table_id to become valid.)

The section_number field indicates a number of a section. (This 8-bit field gives the number of the PSIP_section. The section_number of the first section in a PSIP table can be 0x00. The section_number can be incremented by 1 with each additional section in PSIP table. The scope of the section_number can be defined by the table_id and table_id_extension. That is, for each PSIP table and value of the table_id_extension field, there is the potential for the full range of section_number values.)

The last_section_number field identifies a number of the last section. (This 8-bit field specifies the number of the last section (that is, the section with the highest section_number) of the PSIP table of which this section is a part. Its scope is the same as for the section_number field.)

The protocop_version field has a function of allowing future use of a current table type that transmits parameters different from those defined in a current protocol. (An 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.)

The num_channels_in_section field indicates the number of virtual channel resolutions. (The num_channels_in_section field in ATSC Cable Virtual Channel table CVCT table sections is an eight-bit field that indicates the number of virtual channel definitions to follow in the table section.)

The short_name field is a 112-bit field indicating a short name for a virtual channel. (The short_name field is a 112-bit field in ATSC CVCT table sections that gives the short_name for the virtual channel. Each letter of the short_name is formatted as a 16-bit Unicode character, with the high order byte transmitted first. So, short_name for TVCT and CVCT entries is seven Unicode characters, which short_name for SVCT entries is eight Unicode characters. If the display name is less than the number of permitted characters, 0/0x00 is appended to the end until the alloted number of bits has been reached.)

The major_channel_number field indicates the number of major channels related to a virtual channel. (A 10-bit number that represents the "major" channel number associated with the virtual channel being defined in this iteration of the "for" loop. Each virtual channel can be associated with a major and a minor channel number. The major channel number, along with the minor channel number, act as the user's reference number for the virtual channel. The major_channel_number can be between 1 and 99. The value of major_channel_number can be set such that in no case is a major_channel_number/minor_channel_number pair duplicated within the TVCT.)

The minor_channel_number field indicates the number of minor channels related to a virtual channel. (A 10-bit number in the range 0 to 999 that represents the "minor" or "sub"-channel number. This field, together with major_channel_number, performs as a two-part channel number, where minor_channel_number represents the second or right-hand part of the number. When the service_type is analog television, minor_channel_number can be set to 0.)

The modulation mode field indicates a modulation scheme for a transmission carrier of a virtual channel. (The modulation_mode is an eight-bit field in a virtual channel entry tells receivers the modulation used to transmit individual channels.)

The carrier_frequency field carries carrier frequency information used by a transport virtual channel. (The carrier frequency is a 32-bit field that transmits the carrier frequency used by the transport carrying the virtual channel.)

The channel_TSID field indicates an MPEG-2 TS ID for a TS that carries an MPEG-2 program related to a virtual channel. (The channel_TSID is a 16-bit unsigned integer field that gives the transport_stream_id of the channel that carries (or for inactive channels, will carry) the virtual channel.)

The program_number field identifies each program service or a virtual channel in a TS. (The program_number is a 16-bit unsigned integer that uniquely identifies each program service (or virtual channel) present in a transport stream.)

The ETM_location field indicates whether an extended text message for a channel, an event, or a data event is present. (The ETM_location field denotes whether there is an extended text message for the channel (Channel Extended Text table or CETT), event (Event Extended Text table) or data event (Data Extended Text table).)

The access_controlled field indicates whether an event associated with a corresponding virtual channel can be controlled. (When access_controlled is set to '1', means that events associated with this virtual channel may be access controlled. When set to '0', access to event is not controlled.)

The hidden field indicates whether a corresponding channel can be accessed by direct entry (or field, attribute or entity) of a virtual channel numeral. (When hidden is set to '1', means the channel cannot be accessed by direct entry of the virtual channel number. When set to '0', virtual can be accessed by direct entry.)

The hide_guide field indicates whether a corresponding channel can be accessed by direct entry (or field, attribute, or entity) of a virtual channel numeral. (When hide_guide is set to '1', means the channel cannot be accessed by direct entry of the virtual channel number. When set to '0', virtual can be accessed by direct entry.)

The service_type field identifies a service type set in a virtual channel. (The service_type is a 6-bit enumerated field that identifies the type of service set in the virtual channel.) As an embodiment of a UHD service, a service type may be designated as a parameterized service (0x07), an extended parameterized service (0x09), or a new DTV service-scalable UHDTV (0x10). The above-described service names and values are an embodiment and other names or values may be used.

The source_id field is a 16-bit unsigned integer indicating a program source associated with a virtual channel. (A 16-bit unsigned integer number that identifies the programming source associated with the virtual channel. In this context, a source is one specific source of video, text, data, or audio programming Source ID value zero is reserved. Source ID values in the range 0x0001 to 0x0FFF can be unique within the Transport Stream that carries the VCT, while values 0x1000 to 0xFFFF can be unique at the regional level. Values for source_ids 0x1000 and above can be issued and administered by a Registration Authority designated by the ATSC.)

The descriptors_length field signals the length in bytes of the following descriptor field. (The descriptors_length is a 10-bit unsigned integer field that signals the length in bytes of the descriptor field to follow. If there are no descriptors present, zero would be appropriate.)

The descriptor( ) field is a descriptor loop located within a table. The descriptor loop may include an additional descriptor. The above-described UD_program_descriptor and/or HDR_sub_stream_descriptor according to an embodiment of the present invention may be included in this descriptor. When HDR_substream_metada is not transmitted through an SEI message, the HDR_substream_metadata may be included in the TVCT.

According to an embodiment of the present invention, a Cable Virtual Channel Table (CVCT) corresponding to the TVCT in the case of cable may include a table_id field, a section_syntax_indicator field, a private_indicator field, a section_length field, a transport_stream_id field, a version_number field, a current_next_indicator field, a section_number field, a last section_number field, a protocop_version field, a num_channels_in_section field, a short_name field, a major_channel_number field, a minor_channel_number field, a modulation mode field, a carrier_frequency field, a channel_TSID field, a program_number field, an ETM_location field, an access_controlled field, a hidden field, a path_select field, an out_of band field, a hide guide field, a service_type field, a source_id field, a descriptors_length field, and/or a descriptor( ). Among the fields constituting the CVCT, fields having the same name as the fields constituting the above-described TVCT may have the same meaning as the fields of the same name constituting a TVCT. The descriptor( ) field according to an embodiment of the present invention is a descriptor loop located in a table. The descriptor loop may include an additional descriptor. The above-described UDprogram_descriptor and/or HDR_sub_stream_descriptor according to an embodiment of the present invention may be included in this descriptor. If the HDR_substream_metadata is not transmitted through the SEI message, the HDR_substream_metada may be included in the CVCT.

Figure 26:
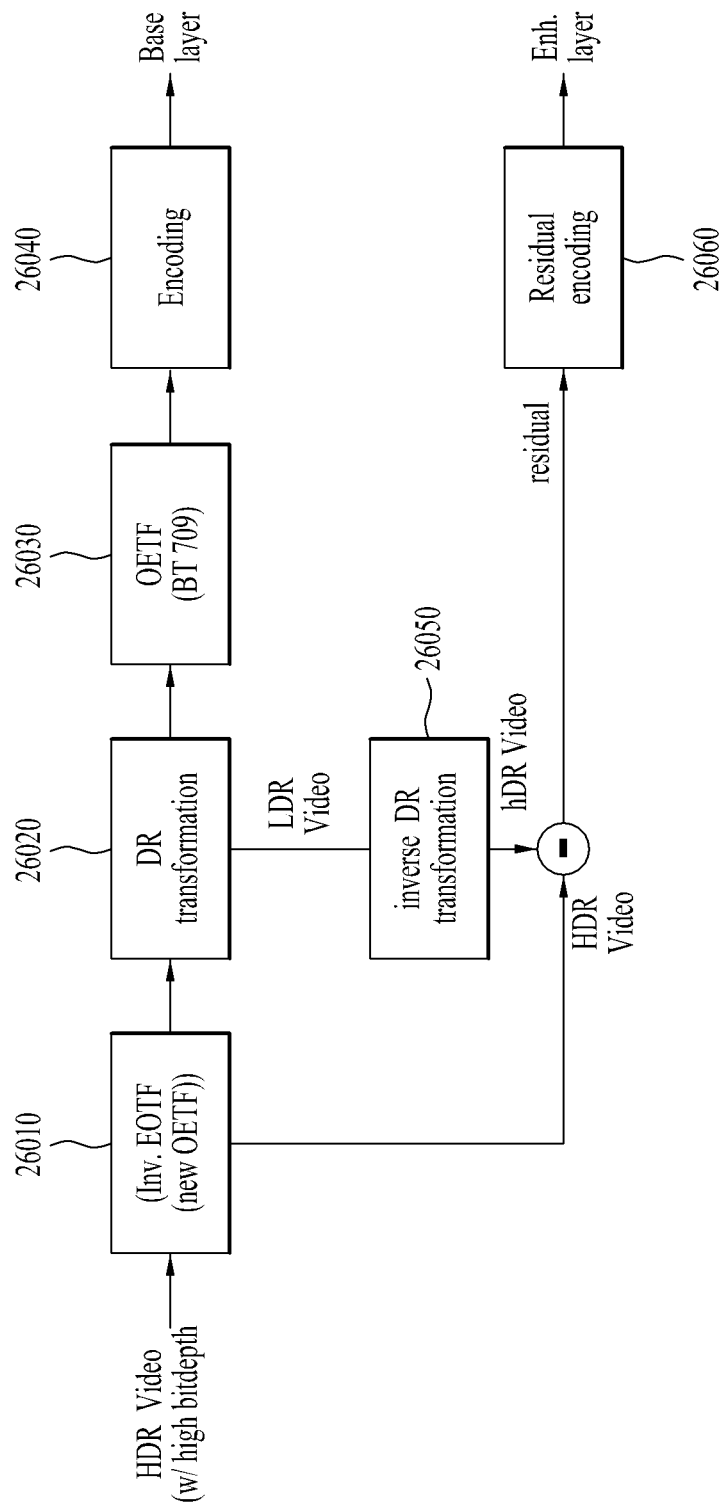
FIG. 26 is a diagram illustrating the operation of a broadcast signal transmitter according to an embodiment of the present invention.

FIG. 26 is a diagram illustrating the operation of a broadcast signal transmitter according to an embodiment of the present invention.

As illustrated in FIG. 26, according to an embodiment of the present invention, HDR video data having high bit depth may be separated into an LDR video data part that can be reproduced by a legacy receiver and a part for expressing a dynamic range of an HDR video (residual information part). A broadcast signal transmitter according to an embodiment of the present invention may transmit the LDR video data through a base layer and transmit the residual information part through an enhancement layer.

The operation of the broadcast signal transmitter according to an embodiment of the present invention may include an inverse EOTF processing process 26010, a dynamic range transformation process 26020, an OETF processing process 26030, an encoding process 26040, an inverse dynamic range transformation process 26050, and/or a residual information encoding process 26060.

The inverse EOTF processing process 26010 may linearly transform the luminance variation of original HDR video data. However, if the luminance variation of the HDR video data is already linear, this process may not be used. According to an embodiment of the present invention, if a new EOTF suitable for the HDR video data is used, an inverse function of the used EOTF may be used in this process. As illustrated in FIG. 26, the inverse function of the EOTF according to an embodiment of the present invention may be referred to as an OETF.

The dynamic range transformation process 26020 transforms the HDR video data having linear luminance by the inverse EOTF processing process 26010 into LDR video data suitable for a display of a legacy receiver. In this process, a linear mapping scheme, a clipping scheme, a piecewise non-linear curve processing scheme, etc. may be used. According to an embodiment of the present invention, in this process, a linear function, a logarithmic function, an exponential function, an inverse s-curve, etc. may be used to transform a dynamic range and information used to transform the dynamic range may be transmitted to a receiver through a table, such as a PMT, an SDT, an EIT, a TVCT, or a CVCT, and/or an SEI message.

The OETF processing process 26030 may process an EOTF, which can be received by a legacy receiver, with respect to the LDR video data. For example, an EOTF defined in ITUR BT.709 may be used or an EOTF defined in other standards or a random EOTF may be used.

The encoding process 26040 may compress the LDR video data using a codec, such as HEVC, that can be processed by the legacy receiver. According to an embodiment of the present invention, the encoded LDR video data may be transmitted to the receiver through a base layer.

The inverse dynamic range transformation process 26050 may generate video data having the same brightness scale as original HDR video data by inversely transforming a dynamic rage of the LDR video data immediately before the OETF processing process 26030. According to an embodiment of the present invention, in the inverse dynamic range transformation process, the LDR video data may be transformed into HDR estimation video data. According to an embodiment of the present invention, a transformation function or curve used in this process may be an inverse function of the transformation function used in the above-described dynamic range transformation process 26020.

The transmitter according to an embodiment of the present invention may include a process (not shown) of generating residual information. The transmitter may generate a difference image calculated by comparing the luminance of HDR estimation video data, which is generated by inversely transforming the dynamic rage of the LDR video data in the inverse dynamic range transformation process 26050, with the luminance of original HDR video data, in units of pixels. The difference image between the HDR estimation video data and the original HDR video data may be referred to as the residual information. The residual information according to an embodiment of the present invention may indicate a difference in luminance between the HDR estimation video data and the original HDR video data, with respect to a dynamic range from an LDR to an HDR. According to an embodiment of the present invention, when dynamic range stretching occurs by a different method according to a section as in the case in which a piecewise non-linear curve is used according to each section as in the case in which a piecewise non-linear curve varying with the section of a dynamic range is used in the foregoing dynamic range transformation process 26010, each luminance point cannot be accurately mapped only by inverse transformation using an inverse function of the transformation function used in the dynamic range transformation process 26010. Accordingly, in order to raise accuracy of dynamic range transformation, this process of generating the difference value in pixels obtained by comparing video data generated by inversely transforming the LDR video data with the original HDR video data is needed.

The residual information encoding process 26060 compresses the residual information generated in the previous process. According to an embodiment of the present invention, Scalable Video Coding (SVC), Scalable HEVC (SHVC), AVC, HEVC, etc. may be used and an additional compression scheme capable of being processed in the receiver may be used. The residual information encoded by this residual information encoding process may be transmitted to the receiver through an enhancement layer.

According to an embodiment of the present invention, the operation of the transmitter may include a process of generating signaling information including information for decoding an enhancement layer stream including the residual information, a process of multiplexing the base layer stream, the enhancement layer stream, and the signaling information into one broadcast stream, a process of generating a broadcast signal by modulating the multiplexed broadcast stream, and/or a process of transmitting the generated broadcast signal.

Figure 27:
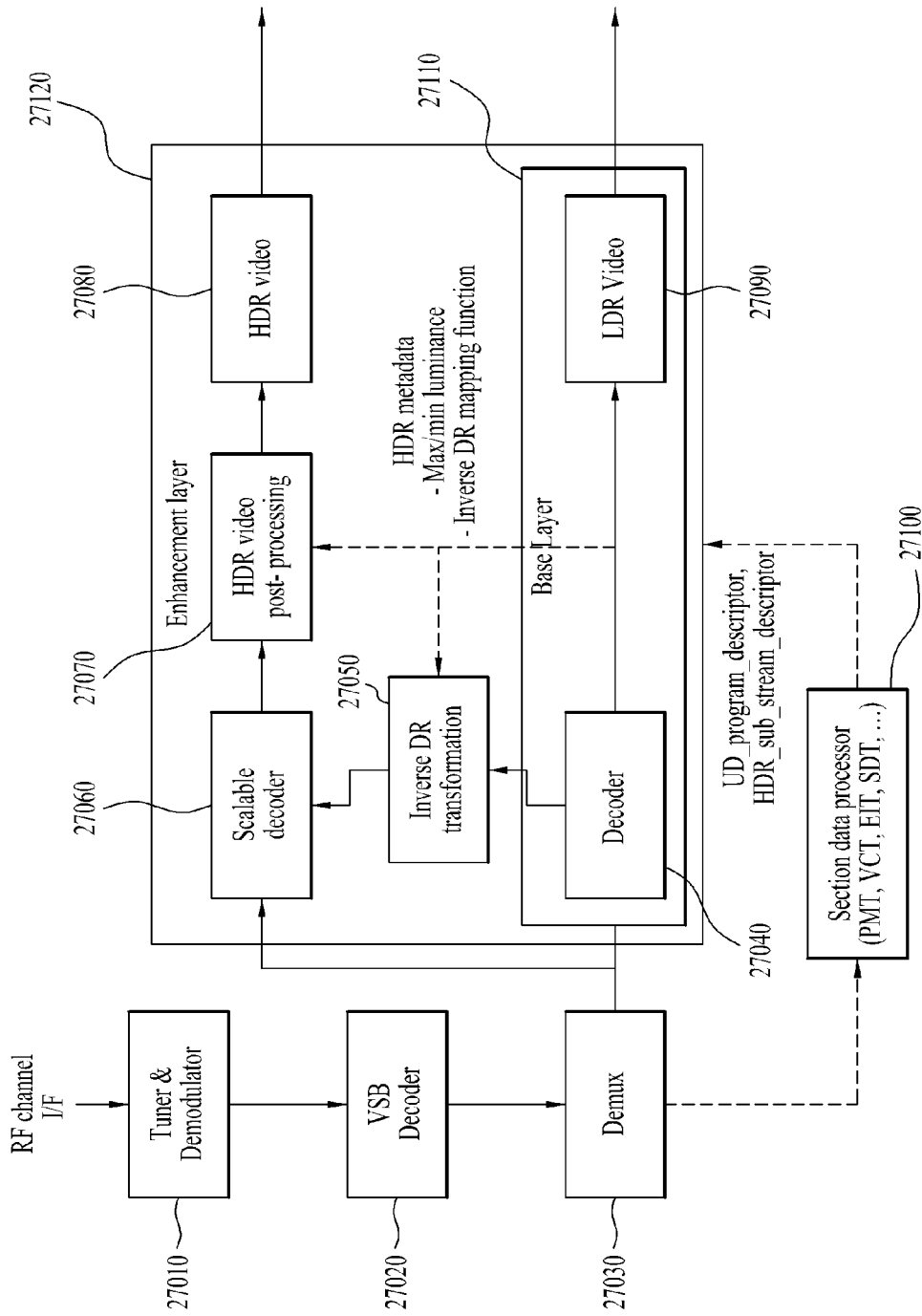
FIG. 27 is a diagram illustrating the structure of a UHD broadcast signal reception apparatus for HDR video data having backward compatibility according to an embodiment of the present invention.

FIG. 27 is a diagram illustrating the structure of a UHD broadcast signal reception apparatus for HDR video data having backward compatibility according to an embodiment of the present invention.

The UHD broadcast signal reception apparatus according to an embodiment of the present invention may include a tuner and demodulator 27010, a Vestigial Side Band (VSB) decoder 27020, a demultiplexer (Demux) 27030, a section data processor 27100, and/or a backward compatibility decoder 27120.

The tuner and demodulator 27010 may receive a broadcast signal including LDR video data, residual information, and/or signaling information and acquire a broadcast stream by demodulating the received broadcast signal.

The VSB decoder 27020 may be included in the above-described demodulator and may decode a broadcast signal modulated by a VSB scheme. In this case, VSB is an abbreviation for vestigial side band. If voice or other signal waves are amplitude-modulated, an amplitude-modulated frequency spectrum is reserved such that a spectrum of an original signal wave becomes VSBs of upper/lower and right/left sides centered on a carrier frequency. The VSB scheme serves to eliminate the greater part of any one of the VSBs and to transmit the remaining part and a complete VSB of the other side.

The Demux 27030 may extract a base layer stream including the LDR video data, an enhancement layer stream including residual information, and/or signaling information from one multiplexed broadcast stream.

The section data processor 27100 may process the signaling information extracted from the Demux 27030. According to an embodiment of the present invention, the section data processor 27100 may extract UD_program_descriptor and HDR_sub_stream_description from a PMT, a VCT (a TVCT or a CVCT), an EIT, an SDT, etc. included in the signaling information. Information for decoding an enhancement layer stream included in UD_program_descriptor and HDR_sub_stream_description and/or HDR configuration information may be used to decode video data in the backward compatibility decoder 27120.

The backward compatibility decoder 27120 may decode the base layer stream and/or the enhancement layer stream extracted from the Demux 27030.

The backward compatibility decoder 27120 according to an embodiment of the present invention may include a base layer decoder 27110, an inverse dynamic range transformation unit 27050, a scalable decoder 27060, and/or an HDR video post-processing unit 27070.

The base layer decoder 27110 may include a decoder 27040 for acquiring LDR video (data) 27090 by decoding the base layer stream extracted from the Demux 27030. According to an embodiment of the present invention, the base layer decoder 27110 or the decoder 27040 may be referred to as a first decoder.

The inverse dynamic range transformation unit 27050 may obtain HDR estimation video data by inversely transforming the dynamic range of the LDR video data acquired from the decoder 27040. When the dynamic range of the LDR video data is inversely transformed, HDR configuration information may be used. In this case, the HDR configuration information may include maximum and minimum luminance information of original HDR video data and/or the LDR video data and include information about a transformation function that has been used when the LDR video data is generated by transforming the dynamic range of the original HDR video data in the transmitter.

The scalable decoder 27060 may obtain the residual information by decoding the enhancement layer stream extracted from the Demux 27030 based on the signaling information processed in the section data processing unit 27100. The signaling information may include information for decoding the enhancement layer stream. The scalable decoder 27060 may obtain HDR video (data) 27080 based on the residual information and the HDR estimation video data acquired from the inverse dynamic range transformation unit 27050. The scalable decoder 27060 according to an embodiment of the present invention may include the inverse dynamic range transformation unit 27050 and may be referred to as a second decoder.

The HDR video post-processing unit 27070 may adjust the luminance of content in order to provide an optimal viewing environment and, for a detailed description thereof, refer to the description of the drawing illustrating the operation of the above-described HDR video post-processing 2080.

Figure 28:
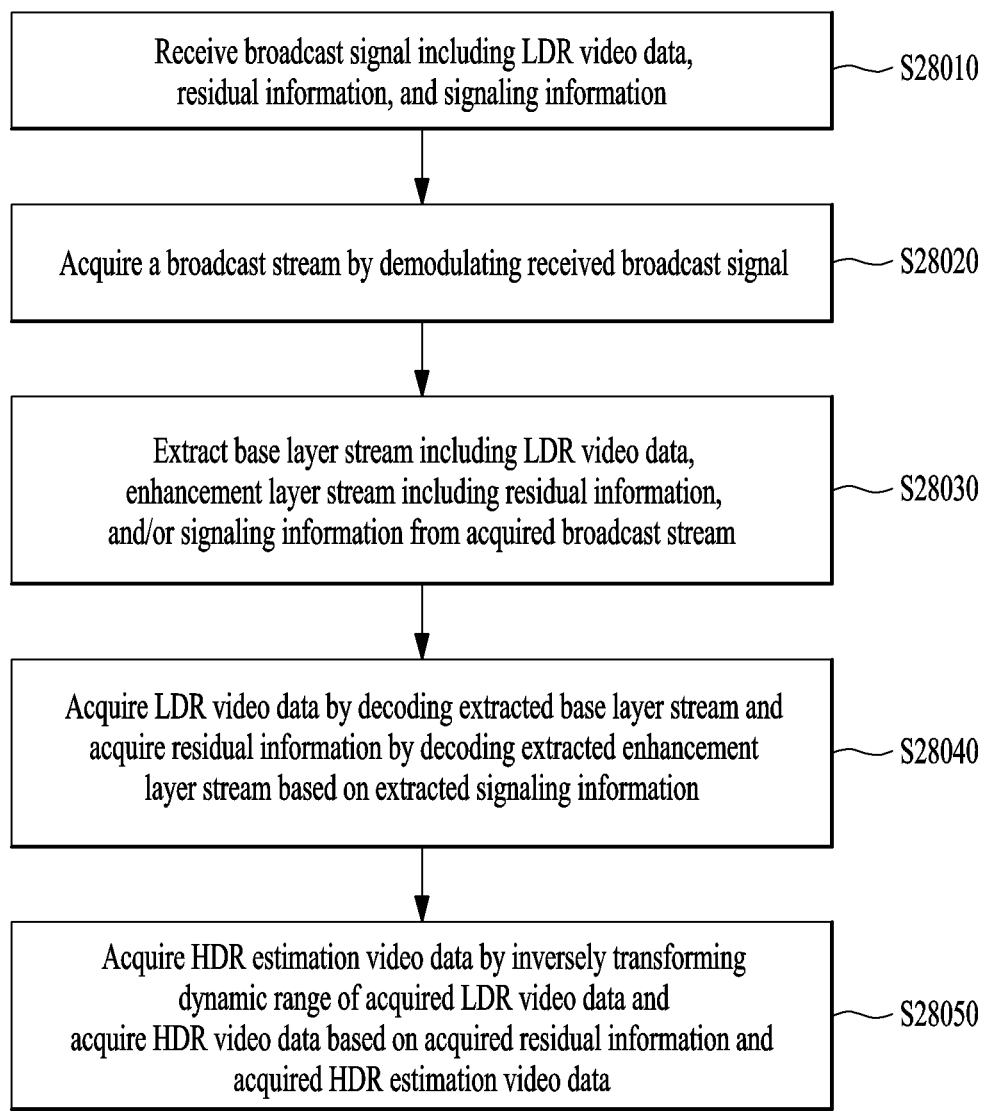
FIG. 28 is a diagram illustrating a broadcast signal reception method according to an embodiment of the present invention.

FIG. 28 is a diagram illustrating a broadcast signal reception method according to an embodiment of the present invention.

The broadcast signal reception method according to an embodiment of the present invention may include the following processes. First, a receiver may receive a broadcast signal including LDR video data, residual information, and signaling information (S28010). The LDR video data is generated by transforming a dynamic range of HDR video data and the residual information may indicate a difference value calculated by comparing, in units of pixels, the luminance of HDR estimation video data, which is generated by inversely transforming a dynamic range of the generated LDR video data, with the luminance of the HDR video data. The signaling information may include information for decoding an enhancement layer stream including the residual information. Next, the receiver may acquire a broadcast stream by demodulating the received broadcast signal (S28020). Next, the receiver may extract a base layer stream including the LDR video data, an enhancement layer stream including the residual information, and/or the signaling information from the acquired broadcast stream (S28030). Next, the receiver may acquire the LDR video data by decoding the extracted base layer stream and acquire the residual information by decoding the extracted enhancement layer stream based on the extracted signaling information (S28040). Next, the receiver may acquire the HDR estimation video data by inversely transforming the dynamic range of the acquired LDR video data and acquire the HDR video data based on the acquired residual information and the acquired HDR estimation video data (S28050).

According to another embodiment of the present invention, the signaling information may include HDR configuration information needed to generate the HDR estimation video data from the LDR video data. For a detailed description of the HDR configuration information, refer to the description of FIGS. 3, 7, 12, 13, 22, and 27.

According to another embodiment of the present invention, the information for decoding the enhancement layer stream may include tier information for determining the limit of a bit rate of the enhancement layer stream, type information of a codec used for the enhancement layer stream, profile information indicating the characteristic of the enhancement layer stream, and/or level information indicating an application range of the characteristic of the enhancement layer stream according to the profile information. For a detail description of the foregoing information for decoding the enhancement layer stream, refer to the description given with reference to FIGS. 2, 7, 10, 22, 26, and 27.

According to another embodiment of the present invention, the HDR configuration information may include LDR dynamic range type information indicating the dynamic range of the LDR video data, HDR dynamic range type information indicating the dynamic range of the HDR video data, and/or information about a transformation curve used to transform the dynamic range of the LDR video data into the HDR estimation video data. For a detailed description of the HDR configuration information, refer to the description given with reference to FIGS. 3, 7, 12, 13, 22, and 27.

According to another embodiment of the present invention, the HDR configuration information may include information indicating a type of an EOTF that has been used to color-encode the LDR video data, information indicating a type of an EOTF that has been used to color-encode the HDR video data, information indicating a maximum value of a dynamic range expressed in the LDR video data, information indicating a minimum value of the dynamic range expressed in the LDR video data, information indicating a maximum value of a dynamic range expressed in the HDR video data, and/or information indicating a minimum value of the dynamic range expressed in the HDR video data. For a detailed description of the HDR configuration information, refer to the description given with reference to FIGS. 3, 7, 12, 13, 22, and 27.

According to another embodiment of the present invention, the signaling information may include a PMT and/or an SEI message. The PMT may include the information for decoding the enhancement layer stream and the SEI message may include the HDR configuration information. For a detailed description of the signaling information, refer to the description given with reference to FIGS. 7, 9, 10, 11, 22, 25, 26, and 27.

According to another embodiment of the present invention, the signaling information may include the PMT, an SDT, an EIT, a TVCT, and/or a CVCT. At least one of the PMT, the SDT, the EIT, the TVCT, and the CVCT may include the information for decoding the enhancement layer stream and/or the HDR configuration information. For a detailed description of the signaling information, refer to the description given with reference to FIGS. 10 and 22.

Figure 29:
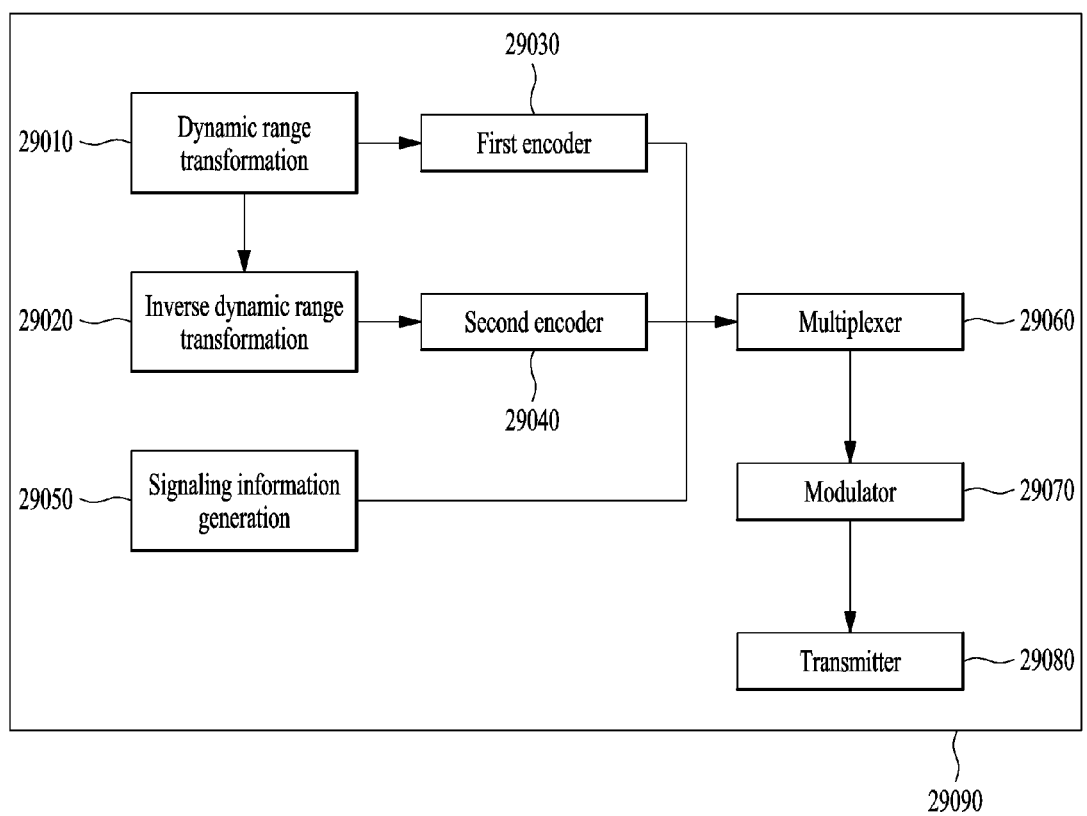
FIG. 29 is a diagram illustrating the structure of a broadcast signal transmission apparatus according to an embodiment of the present invention.

FIG. 29 is a diagram illustrating the structure of a broadcast signal transmission apparatus according to an embodiment of the present invention.

A broadcast signal transmission apparatus 29090 according to an embodiment of the present invention may include a dynamic range transformation unit 29010, an inverse dynamic range transformation unit 29020, a first encoder 29030, a second encoder 29040, a signaling information generation unit 29050, a multiplexer 29060, a modulator 29070, and/or a transmitter 29080.

The dynamic range transformation unit 29010 may generate LDR video data by transforming a dynamic range of HDR video data.

The inverse dynamic range transformation unit 29020 may generate residual information indicating a difference value calculated by comparing, in units of pixels, the luminance of HDR estimation video data, which is generated by inversely transforming the dynamic range of the generated LDR video data, with the luminance of the HDR video data.

The first encoder 29030 may generate a base layer stream by encoding the generated LDR video data.

The second encoder 29040 may generate an enhancement layer stream by encoding the generated residual information.

The signaling information generation unit 29050 may generate signaling information including information for decoding the enhancement layer stream. The generated signaling information may include HDR configuration information needed to generate the HDR estimation video data from the generated LDR video data.

The multiplexer 29060 may multiplex the base layer stream, the enhancement layer stream and the signaling information into one broadcast stream.

The modulator 29070 may generate a broadcast signal including the multiplexed broadcast stream.

The transmitter 29080 may transmit the generated broadcast signal. The transmitter may transmit the broadcast signal through a terrestrial broadcast network, a cable network, and/or an Internet network.

Figure 30:
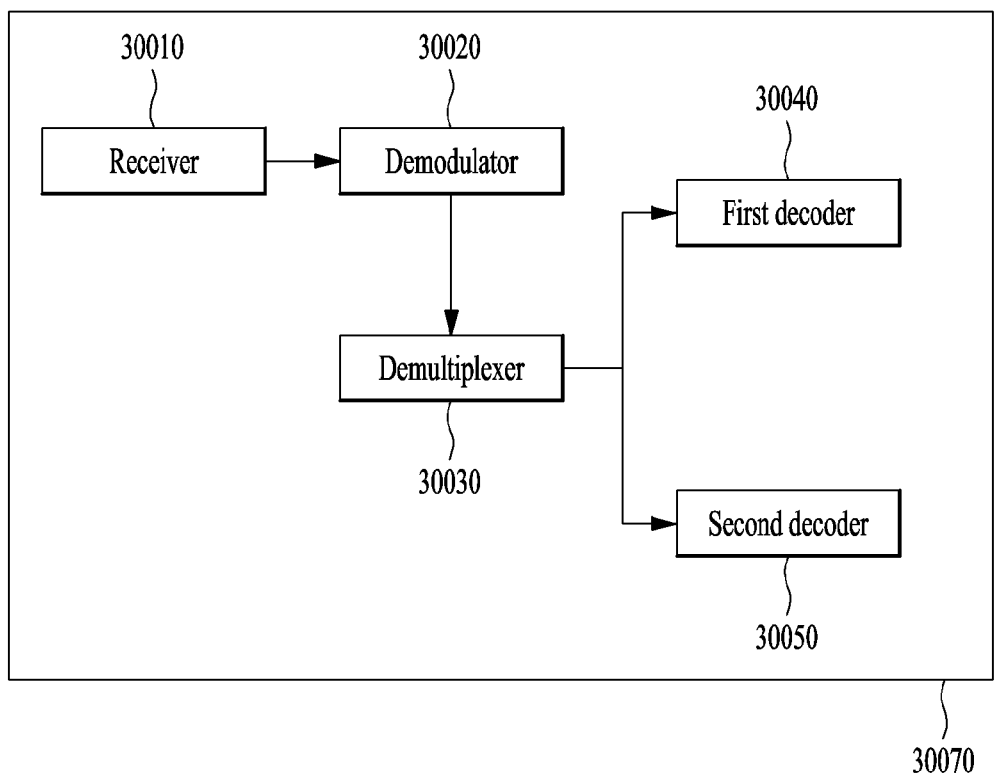
FIG. 30 is a diagram illustrating the structure of a broadcast signal reception apparatus according to an embodiment of the present invention.

FIG. 30 is a diagram illustrating the structure of a broadcast signal reception apparatus according to an embodiment of the present invention.

A broadcast signal reception apparatus 30070 according to an embodiment of the present invention may include a receiver 30010, a demodulator 30020, a demultiplexer 30030, a first decoder 30040, and/or a second decoder 30050.

The receiver 30010 may receive a broadcast signal including LDR video data, residual information, and/or signaling information. The LDR video data is generated by transforming a dynamic range of HDR video data and the residual information may indicate a difference value calculated by comparing, in units of pixels, the luminance of HDR estimation video data, which is generated by inversely transforming a dynamic range of the generated LDR video data, with the luminance of the HDR video data. The signaling information may include information for decoding an enhancement layer stream including the residual information and HDR configuration information needed to generate the HDR estimation video data from the LDR video data. The receiver 30010 may perform the same function as the receiver 27010 of FIG. 27.

The demodulator 30020 may acquire a broadcast stream by demodulating the received broadcast signal. The demodulator 30020 may perform the same function as the demodulator 27010 or the VSB decoder 27020 of FIG. 27.

The demultiplexer 30030 may extract a base layer stream including the LDR video data, an enhancement layer stream including residual information, and/or signaling information from the acquired broadcast stream. The demultiplexer 30030 may perform the same function as the first demultiplexer 2010 and/or the second demultiplexer 2050 of FIG. 2 and perform the same function as the demultiplexer 27030 of FIG. 27.

The first decoder 30040 may obtain the LDR video data by decoding the extracted base layer stream. The first decoder 30040 may perform the same function as the base layer decoder 2020 of FIG. 2 and perform the same function as the base layer decoder 27110 or the decoder 27040 of FIG. 27.

The second decoder 30050 may obtain the residual information by decoding the extracted enhancement layer stream based on the extracted signaling information, obtain the HDR estimation video data by inversely transforming the dynamic range of the obtained LDR video data, and obtain the HDR video data based on the obtained residual information and HDR estimation video data. The second decoder 30050 may perform the same function as the enhancement layer decoder 2060 of FIG. 2 and perform the same function as the backward compatibility decoder 27120 of FIG. 27 except for the base layer decoder 27110. The second decoder 3050 may include the enhancement layer decoder 2060, the video composition unit 2070, and/or the HDR video post-processing unit 2080 of FIG. 2.

While the drawings have been described separately for convenience of description, the embodiments described in the drawings may be combined into a new embodiment. As needed by those skilled in the art, designing a computer-readable recording medium in which a program for implementing the foregoing embodiments of the present invention is recorded falls within the scope of the appended claims and their equivalents.

The apparatus and method according to the present invention are not limited to the above-described embodiments of the present invention. Rather, the embodiments of the present invention may be combined entirely or in part so as to realize variations of the present invention.

The image processing method according to the present invention may be implemented as processor-readable code that can be written in a recording medium readable by a processor included in a network device. The processor-readable recording medium includes any type of recording device in which processor-readable data is stored. Examples of the processor-readable recording medium include a ROM, a RAM, a CD-ROM, a magnetic tape, a floppy disk, an optical data storage device, and a carrier wave (e.g. data transmission over the Internet). The processor-readable recording medium can be distributed over computer systems connected to a network so that processor-readable code is stored therein and executed therefrom in a decentralized manner.

While the present invention has been particularly shown and described with reference to exemplary embodiments thereof, it will be understood by those of ordinary skill in the art that various changes in form and details may be made therein without departing from the spirit and scope of the present invention as defined by the following claims and such modifications and variations should not be understood individually from the technical idea or aspect of the present invention.

The present specification has described product inventions and method inventions and, when necessary, both product inventions and method inventions may be complementarily applicable to each other.

MODE FOR INVENTION

Various embodiments have been described in the best mode for carrying out the invention.

INDUSTRIAL APPLICABILITY

The present invention is applicable to the entire broadcast industry.

The invention claimed is:

1. A method for transmitting a broadcast signal, the method comprising:
generating Low Dynamic Range (LDR) video data by transforming a dynamic range of High Dynamic Range (HDR) video data;
generating residual information indicating a difference value calculated by comparing, in units of pixels, luminance of HDR estimation video data, which is generated by inversely transforming a dynamic range of the generated LDR video data, with luminance of the HDR video data;
generating a base layer stream by encoding the generated LDR video data;
generating an enhancement layer stream by encoding the generated residual information;
generating a program map table (PMT) including a ultra high definition (UHD) program descriptor describing information for indicating whether additional data is needed to configure a UHD program providing the HDR video data,
wherein the UHD program descriptor includes a UHD program format type field indicating that the base layer stream transmitting the LDR video data and the enhancement layer stream transmitting the residual information are needed to configure the UHD program providing the HDR video data,
wherein the PMT further includes a HDR sub stream descriptor describing information on the enhancement layer stream,
wherein the HDR sub stream descriptor includes codec information indicating a type of a codec used for the enhancement layer stream, profile information indicating a profile value which describes specifications for decoding the enhancement layer stream, level information indicating a level value which defines a supportable range of the specifications that the profile value describes and tier information indicating a tier value which is associated with the level value to indicate a maximum bit rate value of the enhancement layer stream;
generating a supplemental enhancement information (SEI) message including a HDR metadata descriptor describing information for configuring the UHD program providing the HDR video data,
wherein the HDR metadata descriptor includes LDR dynamic range type information indicating whether the LDR video data has a dynamic range defined as a standard or a dynamic range defined arbitrarily, HDR dynamic range type information indicating whether the HDR video data has a dynamic range defined as a standard or a dynamic range defined arbitrarily, transformation curve type information indicating a type of a transformation curve used to transform the dynamic range of the LDR video data into a dynamic range of the HDR estimation video data and transformation curve type information indicating coefficients defining the transformation curve according to the type of the transformation curve;

multiplexing the base layer stream, the enhancement layer stream, the SEI message and the PMT into one broadcast stream;

generating a broadcast signal including the multiplexed broadcast stream; and transmitting the generated broadcast signal.

2. The method according to claim 1, wherein the HDR metadata descriptor further includes LDR maximum luminance information indicating a maximum luminance value of the dynamic range of the LDR video data and LDR minimum luminance information indicating a minimum luminance value of the dynamic range of the LDR video data when the dynamic range of the LDR video data is defined arbitrarily, wherein the HDR metadata descriptor further includes HDR maximum luminance information indicating a maximum luminance value of the dynamic range of the HDR video data and HDR minimum luminance information indicating a minimum luminance value of the dynamic range of the HDR video data when the dynamic range of the HDR video data is defined arbitrarily.

3. The method according to claim 1, wherein the HDR metadata descriptor further includes information indicating a type of an Electro Optical Transfer Function (EOTF) that has been used to color-encode the LDR video data and information indicating a type of an EOTF that has been used to color-encode the HDR video data.

4. The method according to claim 3, wherein the HDR metadata descriptor further includes LDR EOTF coefficients defining the EOTF of the LDR video data when the EOTF of the LDR video data is defined arbitrarily, wherein the HDR metadata descriptor further includes HDR EOTF coefficients defining the EOTF of the HDR video data when the EOTF of the HDR video data is defined arbitrarily.

5. A method for receiving a broadcast signal, the method comprising:

receiving a broadcast signal including Low Dynamic Range (LDR) video data, residual information, a supplemental enhancement information (SEI) message and a program map table (PMT), wherein the LDR video data is generated by transforming a dynamic range of High Dynamic Range (HDR) video data, the residual information indicates a difference value calculated by comparing, in units of pixels, luminance of HDR estimation video data, which is generated by inversely transforming a dynamic range of the LDR video data, with luminance of the HDR video data, and the PMT includes a ultra high definition (UHD) program descriptor describing information for indicating whether additional data is needed to configure a UHD program providing the HDR video data;

acquiring a broadcast stream by demodulating the received broadcast signal;

extracting a base layer stream including the LDR video data, an enhancement layer stream including the residual information, the SEI message and the PMT from the acquired broadcast stream, wherein the UHD program descriptor includes a UHD program format type field indicating that the base layer stream transmitting the LDR video data and the enhancement layer stream transmitting the residual information are needed to configure the UHD program providing the HDR video data, wherein the PMT further includes a HDR sub stream descriptor describing information on the enhancement layer stream, wherein the HDR sub stream descriptor includes codec information indicating a type of a codec used for the enhancement layer stream, profile information indicating a profile value which describes specifications for decoding the enhancement layer stream, level information indicating a level value which defines a supportable range of the specifications that the profile value describes and tier information indicating a tier value which is associated with the level value to indicate a maximum bit rate value of the enhancement layer stream, wherein the SEI message includes a HDR metadata descriptor describing information for configuring the UHD program providing the HDR video data, wherein the HDR metadata descriptor includes LDR dynamic range type information indicating whether the LDR video data has a dynamic range defined as a standard or a dynamic range defined arbitrarily, HDR dynamic range type information indicating whether the HDR video data has a dynamic range defined as a standard or a dynamic range defined arbitrarily, transformation curve type information indicating a type of a transformation curve used to transform the dynamic range of the LDR video data into a dynamic range of the HDR estimation video data and transformation curve type information indicating coefficients defining the transformation curve according to the type of the transformation curve;

acquiring the LDR video data by decoding the extracted base layer stream;

acquiring the residual information by decoding the extracted enhancement layer stream based on the extracted PMT and the extracted SEI message;

acquiring the HDR estimation video data by inversely transforming the dynamic range of the acquired LDR video data; and acquiring the HDR video data based on the acquired residual information and the acquired HDR estimation video data.

6. The method according to claim 5, wherein the HDR metadata descriptor further includes LDR maximum luminance information indicating a maximum luminance value of the dynamic range of the LDR video data and LDR minimum luminance information indicating a minimum luminance value of the dynamic range of the LDR video data when the dynamic range of the LDR video data is defined arbitrarily, wherein the HDR metadata descriptor further includes HDR maximum luminance information indicating a maximum luminance value of the dynamic range of the HDR video data and HDR minimum luminance information indicating a minimum luminance value of the dynamic range of the HDR video data when the dynamic range of the HDR video data is defined arbitrarily.

7. The method according to claim 5,
wherein the HDR metadata descriptor further includes information indicating a type of an Electro Optical Transfer Function (EOTF) that has been used to color-encode the LDR video data and information indicating a type of an EOTF that has been used to color-encode the HDR video data.

8. The method according to claim 7,
wherein the HDR metadata descriptor further includes LDR EOTF coefficients defining the EOTF of the LDR video data when the EOTF of the LDR video data is defined arbitrarily,
wherein the HDR metadata descriptor further includes HDR EOTF coefficients defining the EOTF of the HDR video data when the EOTF of the HDR video data is defined arbitrarily.

9. An apparatus for transmitting a broadcast signal, the apparatus comprising:
a dynamic range transformation unit to generate Low Dynamic Range (LDR) video data by transforming a dynamic range of High Dynamic Range (HDR) video data;
an inverse dynamic range transformation unit to generate residual information indicating a difference value calculated by comparing, in units of pixels, luminance of HDR estimation video data, which is generated by inversely transforming a dynamic range of the generated LDR video data, with luminance of the HDR video data;
a first encoder to generate a base layer stream by encoding the generated LDR video data;
a second encoder to generate an enhancement layer stream by encoding the generated residual information;
a signaling information generation unit to generate a program map table (PMT) including a ultra high definition (UHD) program descriptor describing information for indicating whether additional data is needed to configure a UHD program providing the HDR video data,
wherein the UHD program descriptor includes a UHD program format type field indicating that the base layer stream transmitting the LDR video data and the enhancement layer stream transmitting the residual information are needed to configure the UHD program providing the HDR video data,
wherein the PMT further includes a HDR sub stream descriptor describing information on the enhancement layer stream,
wherein the HDR sub stream descriptor includes codec information indicating a type of a codec used for the enhancement layer stream, profile information indicating a profile value which describes specifications for decoding the enhancement layer stream, level information indicating a level value which defines a supportable range of the specifications that the profile value describes and tier information indicating a tier value which is associated with the level value to indicate a maximum bit rate value of the enhancement layer stream;
wherein the signaling information generation processor further generates a supplemental enhancement information (SEI) message including a HDR metadata descriptor describing information for configuring the UHD program providing the HDR video data,
wherein the HDR metadata descriptor includes LDR dynamic range type information indicating whether the LDR video data has a dynamic range defined as a standard or a dynamic range defined arbitrarily, HDR dynamic range type information indicating whether the HDR video data has a dynamic range defined as a standard or a dynamic range defined arbitrarily, transformation curve type information indicating a type of a transformation curve used to transform the dynamic range of the LDR video data into a dynamic range of the HDR estimation video data and transformation curve type information indicating coefficients defining the transformation curve according to the type of the transformation curve;
a multiplexer to multiplex the base layer stream, the enhancement layer stream, the SEI message and the PMT into one broadcast stream;
a modulator to generate a broadcast signal including the multiplexed broadcast stream; and
a transmitter to transmit the generated broadcast signal.

10. An apparatus for receiving a broadcast signal, the apparatus comprising:
a receiver to receive a broadcast signal including Low Dynamic Range (LDR) video data, residual information, a supplemental enhancement information (SEI) message and a program map table (PMT), wherein the LDR video data is generated by transforming a dynamic range of High Dynamic Range (HDR) video data, the residual information indicates a difference value calculated by comparing, in units of pixels, luminance of HDR estimation video data, which is generated by inversely transforming a dynamic range of the LDR video data, with luminance of the HDR video data, and the PMT includes a ultra high definition (UHD) program descriptor describing information for indicating whether additional data is needed to configure a UHD program providing the HDR video data;
a demodulator to acquire a broadcast stream by demodulating the received broadcast signal;
a demultiplexer to extract a base layer stream including the LDR video data, an enhancement layer stream including the residual information, the SEI message and the PMT from the acquired broadcast stream,
wherein the UHD program descriptor includes a UHD program format type field indicating that the base layer stream transmitting the LDR video data and the enhancement layer stream transmitting the residual information are needed to configure the UHD program providing the HDR video data,
wherein the PMT further includes a HDR sub stream descriptor describing information on the enhancement layer stream,
wherein the HDR sub stream descriptor includes codec information indicating a type of a codec used for the enhancement layer stream, profile information indicating a profile value which describes specifications for decoding the enhancement layer stream, level information indicating a level value which defines a supportable range of the specifications that the profile value describes and tier information indicating a tier value which is associated with the level value to indicate a maximum bit rate value of the enhancement layer stream,
wherein the SEI message includes a HDR metadata descriptor describing information for configuring the UHD program providing the HDR video data,
wherein the HDR metadata descriptor includes LDR dynamic range type information indicating whether the LDR video data has a dynamic range defined as a standard or a dynamic range defined arbitrarily, HDR dynamic range type information indicating whether the HDR video data has a dynamic range defined as a standard or a dynamic range defined arbitrarily, transformation curve type information indicating a type of a transformation curve used to transform the dynamic range of the LDR video data into a dynamic range of the HDR estimation video data and transformation curve type information indicating coefficients defining the transformation curve according to the type of the transformation curve;

a first decoder to acquire the LDR video data by decoding the extracted base layer stream; and a second decoder to acquire the residual information by decoding the extracted enhancement layer stream based on the extracted PMT and the extracted SEI message, acquire the HDR estimation video data by inversely transforming the dynamic range of the acquired LDR video data, and acquiring the HDR video data based on the acquired residual information and the acquired HDR estimation video data.

* * * * *